US011132646B2

(12) United States Patent
Yamaguchi

(10) Patent No.: US 11,132,646 B2
(45) Date of Patent: Sep. 28, 2021

(54) NON-TRANSITORY COMPUTER-READABLE MEDIUM AND EMAIL PROCESSING DEVICE FOR MISREPRESENTATION HANDLING

(71) Applicant: FUJIFILM Business Innovation Corp., Tokyo (JP)

(72) Inventor: Hiroshi Yamaguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 122 days.

(21) Appl. No.: 15/903,551

(22) Filed: Feb. 23, 2018

(65) Prior Publication Data

US 2018/0300685 A1    Oct. 18, 2018

(30) Foreign Application Priority Data

Apr. 12, 2017  (JP) .............................. JP2017-078760

(51) Int. Cl.
| G06Q 10/10 | (2012.01) |
| H04L 12/58 | (2006.01) |
| G06F 21/60 | (2013.01) |
| G06F 21/64 | (2013.01) |
| G06F 40/166 | (2020.01) |
| G06F 40/295 | (2020.01) |

(52) U.S. Cl.
CPC ........... *G06Q 10/107* (2013.01); *G06F 21/60* (2013.01); *G06F 21/64* (2013.01); *G06F 40/166* (2020.01); *G06F 40/295* (2020.01); *H04L 51/28* (2013.01)

(58) Field of Classification Search
CPC ........ G06F 17/278; G06F 21/60; G06F 21/64; G06Q 10/107; H04L 51/28
See application file for complete search history.

(56) References Cited

U.S. PATENT DOCUMENTS

| 7,636,716 | B1 * | 12/2009 | Cheng ................. | G06Q 10/107 |
| 8,566,938 | B1 * | 10/2013 | Prakash ................. | H04L 51/12 726/22 |
| 8,595,830 | B1 * | 11/2013 | Lee ...................... | H04L 63/145 726/22 |
| 9,154,514 | B1 * | 10/2015 | Prakash ................. | H04L 51/12 |
| 9,398,038 | B2 * | 7/2016 | Higbee ................ | H04L 63/1483 |
| 9,762,612 | B1 * | 9/2017 | Schiffman ........... | H04L 61/1511 |

(Continued)

FOREIGN PATENT DOCUMENTS

| CN | 1665188 A | 9/2005 |
| CN | 1905447 A | 1/2007 |

(Continued)

OTHER PUBLICATIONS

"Microsoft-wo yosootta-fushin mail-no Haishin-ni-tsuite (Suspicious Email Claiming to be from Microsoft)" [online], Jan. 12, 2017,(accessed Mar. 29, 2017), Internet URL:https://news.microsoft.com/ja-jp/2017/01/12/170112_information/.

(Continued)

*Primary Examiner* — Mohamed A. Wasel
(74) *Attorney, Agent, or Firm* — Sughrue Mion, PLLC

(57) ABSTRACT

An email misrepresentation handling process is executed for an email in a case of a mismatch between first sender information detected by a first detection from a body text or a subject of the email, and second sender information detected by a second detection from a header of the email.

10 Claims, 15 Drawing Sheets

(56) References Cited

U.S. PATENT DOCUMENTS

| | | | | |
|---|---|---|---|---|
| 9,847,973 B1* | 12/2017 | Jakobsson | ............ | H04L 63/0263 |
| 10,601,865 B1* | 3/2020 | Mesdaq | ................... | H04L 51/12 |
| 2004/0177120 A1* | 9/2004 | Kirsch | .................... | H04L 29/06 |
| | | | | 709/206 |
| 2005/0071432 A1* | 3/2005 | Royston, III | ........... | H04L 51/12 |
| | | | | 709/206 |
| 2005/0091319 A1* | 4/2005 | Kirsch | .................... | H04L 51/12 |
| | | | | 709/206 |
| 2005/0188024 A1* | 8/2005 | Singer | .................... | H04L 51/12 |
| | | | | 709/206 |
| 2006/0021038 A1* | 1/2006 | Brown | .................... | H04L 51/00 |
| | | | | 726/22 |
| 2006/0053293 A1* | 3/2006 | Zager | .................... | G06Q 20/29 |
| | | | | 713/176 |
| 2006/0123464 A1* | 6/2006 | Goodman | ........... | H04L 63/1466 |
| | | | | 726/2 |
| 2006/0123478 A1* | 6/2006 | Rehfuss | .............. | H04L 63/1408 |
| | | | | 726/22 |
| 2007/0039038 A1* | 2/2007 | Goodman | ........... | H04L 63/1441 |
| | | | | 726/2 |
| 2008/0086532 A1* | 4/2008 | Cunningham | ....... | G06Q 10/107 |
| | | | | 709/206 |
| 2008/0177843 A1* | 7/2008 | Gillum | ................. | G06Q 10/107 |
| | | | | 709/206 |
| 2009/0240774 A1* | 9/2009 | Sachtjen | ............. | H04W 12/069 |
| | | | | 709/206 |
| 2009/0265435 A1* | 10/2009 | Chen | ....................... | H04L 51/14 |
| | | | | 709/206 |
| 2011/0231502 A1 | 9/2011 | Umeshima et al. | | |
| 2012/0158860 A1* | 6/2012 | Chakra | ................... | H04L 51/28 |
| | | | | 709/206 |
| 2015/0067833 A1* | 3/2015 | Verma | ................. | H04L 63/1483 |
| | | | | 726/22 |
| 2016/0014151 A1* | 1/2016 | Prakash | .............. | H04L 63/1483 |
| | | | | 726/22 |
| 2016/0344770 A1* | 11/2016 | Verma | .................... | G06N 20/00 |
| 2017/0251006 A1* | 8/2017 | LaRosa | ............... | H04L 63/1441 |
| 2018/0091476 A1* | 3/2018 | Jakobsson | ........... | H04L 63/1441 |

FOREIGN PATENT DOCUMENTS

| | | |
|---|---|---|
| CN | 101427544 A | 5/2009 |
| CN | 102223316 A | 10/2011 |
| CN | 103139043 A | 6/2013 |
| CN | 103929440 A | 7/2014 |
| CN | 105072137 A | 11/2015 |
| CN | 106453423 A | 2/2017 |
| JP | 2007-11967 A | 1/2007 |
| JP | 2010-061406 A | 3/2010 |
| JP | 2013235489 A | 11/2013 |

OTHER PUBLICATIONS

Communication dated Dec. 22, 2020, from the Japanese Patent Office in application No. 2017-078760.

Office Action dated Jun. 7, 2021 in Chinese Application No. 201711287026.9.

* cited by examiner

| ORGANIZATION NAME | DOMAIN | TELEPHONE NUMBER |
|---|---|---|
| AA | aa.co.jp | 03-1234-5678 |
| SS | ss.co.jp | 0120-123-456 |
| XX | xx.co.jp, xx.com | 0120-000-000 |
| ZZ | zz.com | |
| Ffff Xxxxx | ffffxxxxx.co.jp, ffffxxxxx.net | |
| JPO | jpo.co.jp | |
| USPTO | uspto.gov | |
| AAA | aaa.co.jp | 03-1111-1111 |
| SSS | sss.co.jp | 03-2222-2222 |
| XXX | xxx.co.jp | 0120-345-678 |

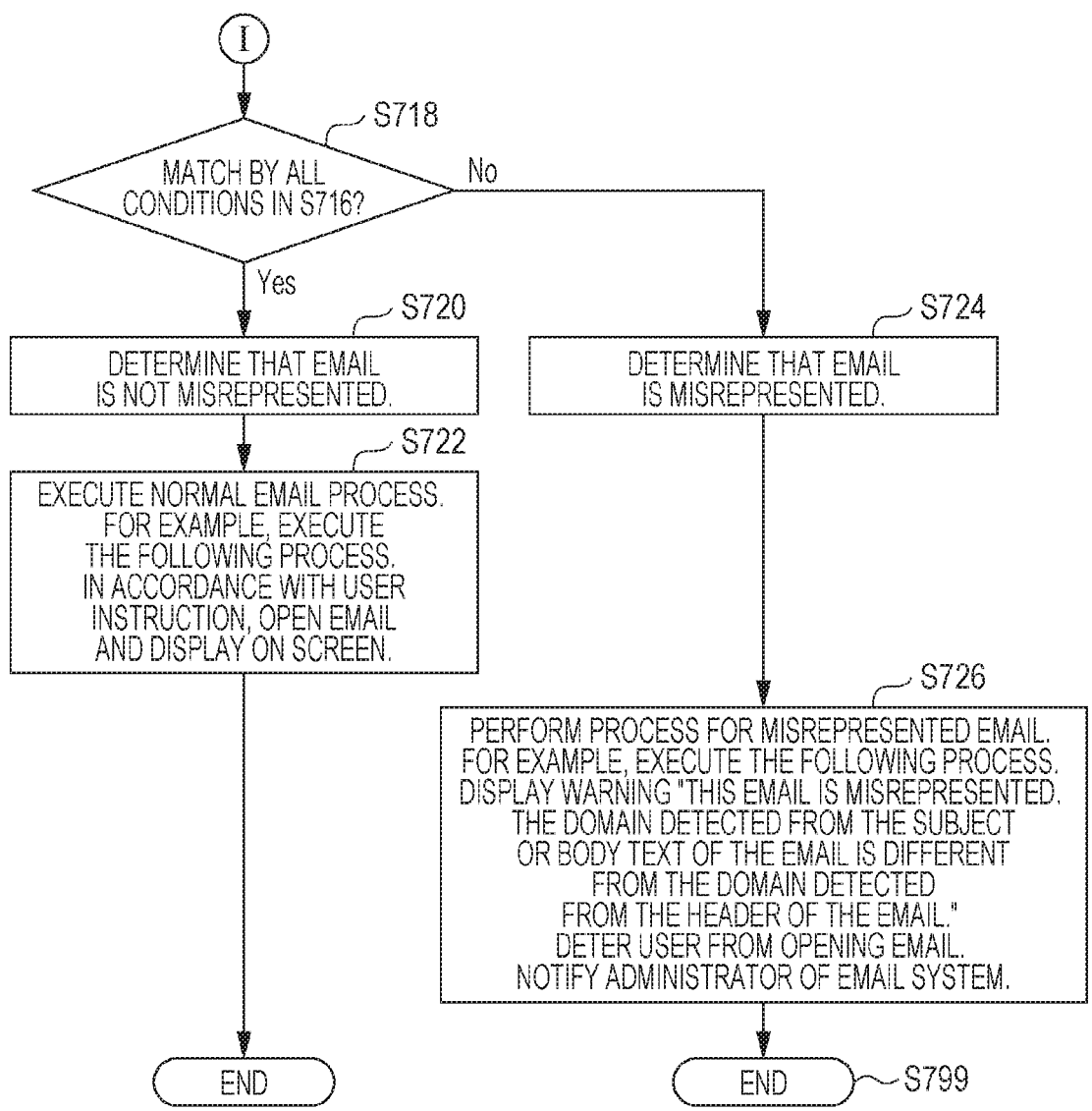

FIG. 14

```
1405A ─── Received: from mail.xx.co.jp
                by mail.aa.co.jp;                        ─ 1400
1405B ─── Received: from pc1.xx.co.jp
                by mail.xx.co.jp;
1410 ─── From: y <y@xx.co.jp>
1415 ─── To: b <b@aa.co.jp>
1420 ─── CC: c <c@aa.co.jp>
1425 ─── Subject: Valuable information (SS CORP.)
1435 ─── Reply-To: y@xx.co.jp
1440 ─── Return-Path : y@xx.co.jp 1445 ─── AA CORP., MR. B
         This information is valuable.
         Open or click this link.
         http//www.xx.co.jp ─── 1450

Call this number.
         Telephone number: 0120-000-000 ─── 1455

SS CORP., T ─── 1460
         t@ss.co.jp ─── 1465
```

FIG. 15

```
1505A ── Received: from mail.xx.co.jp
              by mail.aa.co.jp;
1505B ── Received: from pc1.xx.co.jp
              by mail.xx.co.jp;
1510 ── From: y <y@xx.co.jp>
1515 ── To: b <b@aa.co.jp>
1520 ── CC: c <c@aa.co.jp>
1525 ── Subject: Valuable information (SS CORP.)
1535 ── Reply-To: y@xx.co.jp
1540 ── Return-Path : y@xx.co.jp 1545 ── AA CORP., MR. B
         This information is valuable.
         Call this number.
         Telephone number: 0120-000-000 ──1555

SS CORP., T ──1560
         t@ss.co.jp ──1565
```

1500

NON-TRANSITORY COMPUTER-READABLE MEDIUM AND EMAIL PROCESSING DEVICE FOR MISREPRESENTATION HANDLING

CROSS-REFERENCE TO RELATED APPLICATIONS

This application is based on and claims priority under 35 USC 119 from Japanese Patent Application No. 2017-078760 filed Apr. 12, 2017.

BACKGROUND

Technical Field

The present invention relates to a non-transitory computer-readable medium and an email processing device.

SUMMARY

According to an aspect of the invention, there is provided a non-transitory computer-readable medium storing a program causing a computer to execute a process for processing email. The process includes executing a misrepresentation handling process for an email in a case of a mismatch between first sender information detected from a body text or a subject of the email, and second sender information detected from a header of the email.

BRIEF DESCRIPTION OF THE DRAWINGS

Exemplary embodiments of the present invention will be described in detail based on the following figures, wherein:

FIG. 7B is a flowchart illustrating an example process according to an exemplary embodiment;

FIG. 14 is an explanatory diagram illustrating an exemplary data structure of an email;

FIG. 15 is an explanatory diagram illustrating an exemplary data structure of an email;

DETAILED DESCRIPTION

Hereinafter, an exemplary embodiment related to realizing the present invention will be described by way of example on the basis of the drawings.

Figure 1:
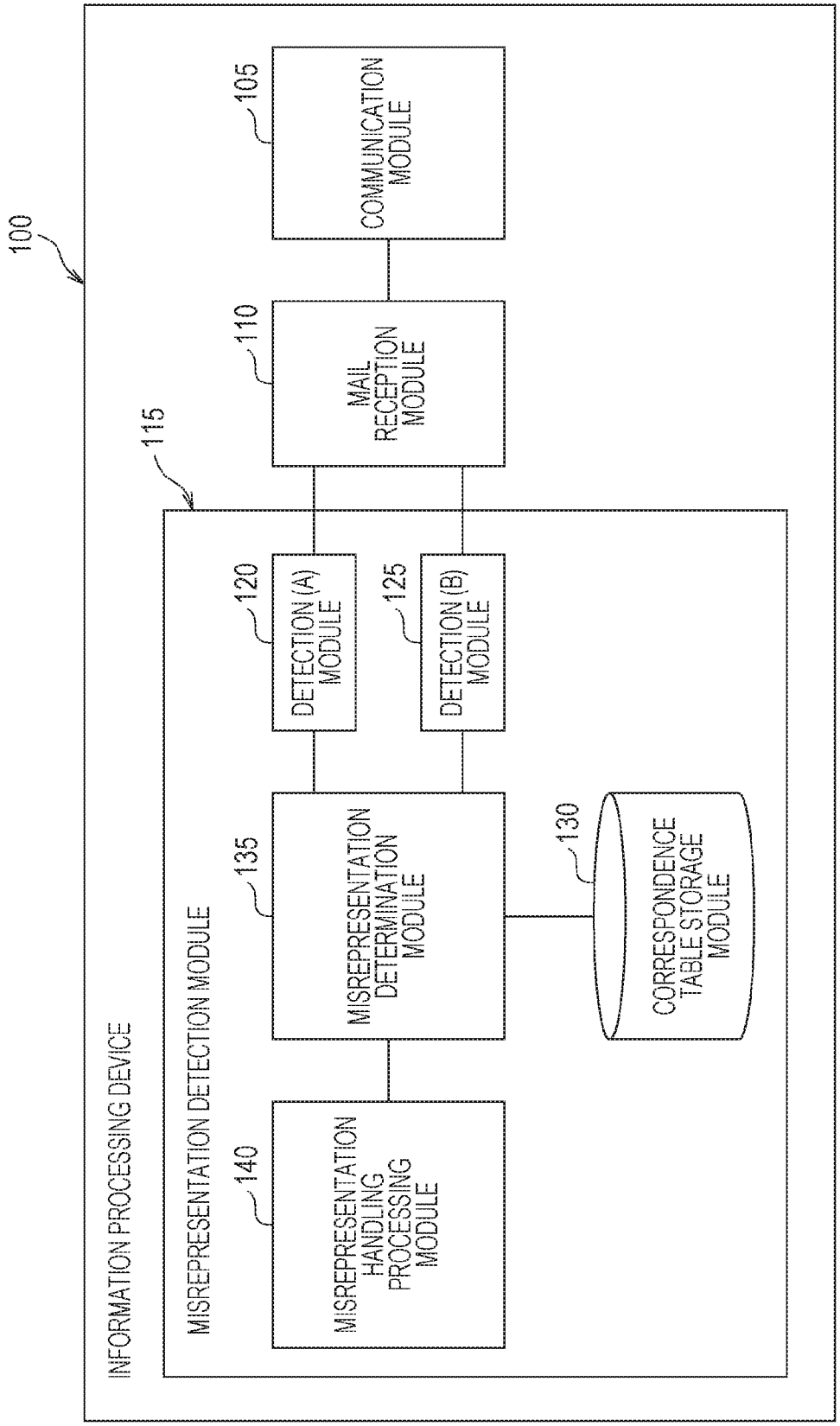
FIG. 1 is a schematic module configuration diagram for an exemplary configuration according to an exemplary embodiment.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, in accordance with conditions or states at that time, or in accordance with conditions or states up to that time. In the case of multiple "predetermined values", the predetermined values may be respectively different values, or two or more values (this obviously also includes the case of all values) which are the same. Additionally, statements like "B is executed in the case of A" are used to denote that a determination is made regarding whether or not A holds true, and B is executed in the case where it is determined that A holds true. However, this excludes cases where the determination of whether or not A holds true may be omitted. Also, in the case of listing things, like "A, B, C" and so on, the listing is an illustrative example unless specifically noted otherwise, and includes the case of choosing only one among the listing (for example, A only).

Also, the term "system" or "device" not only encompasses configurations in which multiple computers, hardware, or devices are connected by a communication medium such as a network (including connections that support 1-to-1 communication), but also encompasses configurations realized by a single computer, hardware, or device. The terms "device" and "system" are used interchangeably. Obviously, the term "system" does not include merely artificially arranged social constructs (social systems).

Also, every time a process is executed by each module or every time multiple processes are executed within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk, random access memory (RAM), an auxiliary or external storage medium, a storage device accessed via a communication link, and a register or the like inside a central processing unit (CPU).

The information processing device 100 according to the present exemplary embodiment receives email and detects email that is misrepresenting the sender. As illustrated in the example of FIG. 1, the information processing device 100 includes a communication module 105, a mail reception module 110, and a misrepresentation detection module 115.

"Email that is misrepresenting the sender" refers to email in which information about the sender (also called terms such as the source or addresser) has been forged, and is also referred to as spoofed email, forged email, or the like. For example, email in which the sender, the subject (also called terms such as the title or heading), the body text, and the like have been faked to be different from the truth corresponds to "email that is misrepresenting the sender".

Email includes items in which the sender is able to state content (such as the subject, the body text, and the From header field, for example). The objective of email that is misrepresenting the sender is to make the receiver of the email believe that the sender of the email belongs to a prominent company, for example. For this reason, email that is misrepresenting the sender states the company name or domain of a prominent company in an item in which the sender is able to state content (such as the subject, body text, or the From header field, for example). In addition, email includes items in which the sender is unable to state content (such as the Received header field) as part of the header. For example, the Received header field is information added by the email server, and is information in which the sender is unable to state content. Consequently, in the case of misrepresenting the sender of an email, it is difficult to make all of the domains or organization names of the sender in the email match each other. Particularly, discrepancies tend to be produced between the header part and the body text (or subject) of an email, and between the body text (or subject) and itself. The present exemplary embodiment takes these points into account to detect the misrepresentation of email.

In an example illustrated in "Suspicious Email Claiming to be from Microsoft", [online], Jan. 12, 2017 (accessed Mar. 29, 2017), Internet (URL: https://news.microsoft.com/ja-jp/2017/01/12/170112_information/), if the sender address is "support@microsoft-securityprotection-support.com", and if the correct domain of Microsoft Japan Co., Ltd. is "microsoft.co.jp" or "microsoft.com", the sender address may not necessarily be misrepresented. Consequently, in this example, determining that an email is suspicious may be difficult just from information obtained from the header of the email.

For example, the technology described in Japanese Unexamined Patent Application Publication No. 2010-061406 detects misrepresentation of the source of an email, on the basis of information in the Received header field and the From header field in the header of the email. However, in the case in which the header field is not misrepresented, like in the example illustrated in "Suspicious Email Claiming to be from Microsoft", trace information and the source email address match, and thus the email is determined not to be misrepresented. In other words, in the case in which the information in the Received header field and the From header field of an email match each other, misrepresented email cannot be detected with the technology described in Japanese Unexamined Patent Application Publication No. 2010-061406.

As another example, with the technology described in Japanese Unexamined Patent Application Publication No. 2007-011967, the displayed content "Nakao Shokai" and the link destination URL "http://hide.com" of a link using an <a> tag in the email body text are extracted and sent to an authentication server. On the authentication server, if the combination of the displayed content and the destination link URL in the link match registered authentication information, the combination is determined to be authentic. In other words, if the combination of the displayed content and the link destination URL in a link in the email body text is not already registered in the authentication server, the email is determined to be inauthentic.

(1) The technology described in Japanese Unexamined Patent Application Publication No. 2007-011967 only utilizes links.

The present exemplary embodiment analyzes text strings in the entire body text, not just limited to links, estimates a sender domain from an organization name (an organization name indicating the sender), and determines whether or not the domain corresponds to a sender domain in the header part. Alternatively, an organization name is estimated from a sender domain in the header part, and it is determined whether or not the domain corresponds to the organization name in the header part. Consequently, misrepresentation can be determined even for emails that do not contain a URL link.

(2) The technology described in Japanese Unexamined Patent Application Publication No. 2007-011967 extracts two pieces of information (the displayed content and the link destination URL in a link) from the body text of an email, and determines misrepresentation with the combination of information.

The present exemplary embodiment determines misrepresentation with a domain (or organization name) of the sender detected from the body text of the email, and a domain (or organization name) of the sender detected from the header part (such as the Received field).

(3) The technology described in Japanese Unexamined Patent Application Publication No. 2007-011967 requires advance registration in an authentication server of legitimate (not misrepresented) combinations of the displayed content and the link destination URL in a link. In other words, misrepresenting data must not be registered. However, registering only legitimate data while keeping misrepresented data from being registered is difficult.

The present exemplary embodiment utilizes a correspondence table between organization names and domains, like the correspondence table 600 illustrated in FIG. 6 to be described later. However, the present exemplary embodiment does not simply distinguish between legitimacy and misrepresentation based on the correspondence table alone. In other words, since the correspondence table may include legitimate data and misrepresenting data, creating the correspondence table is easier than the data registration according to the technology described in Japanese Unexamined Patent Application Publication No. 2007-011967. Note that the "misrepresenting data" which may be included in the correspondence table refers to data about combinations of an organization name that is attempting misrepresentation and a domain used by the organization with the organization name, and thus such data itself is not misrepresented. Specifically, in the case in which Company B is trying to misrepresent Company A, the combination of the organization name "Company A" and the domain "A-domain" used by Company A may be registered in the correspondence table, while in addition, the combination of the organization name "Company B" and the domain "B-domain" used by Company B may be registered. The combination of the organization name "Company A" and the domain "B-domain" used by Company B, or the combination of the organization name "Company B" and the domain "A-domain" used by Company A, is not registered in the correspondence table.

In particular, if a whois service provided by a registry (registration management organization) that manages domains is utilized, it is not necessary to create the correspondence table by oneself. Since there is a 1:1 rule between organizations and domain names (however, the registration of multiple domain names is allowed for general-use JP domain names (.jp), and it is possible for one organization to register two or more organizational-type or geographical-type JP domain names), and since already-registered domain names are not allowed to be registered, the combination of the organization name "Company A" and the domain "B-domain" used by Company B described above, or the combination of the organization name "Company B" and the domain "A-domain" used by Company A, is not registered.

The communication module 105 is connected to the mail reception module 110. The communication module 105 communicates with other devices. The communication includes the transmission or reception of email, for example.

The mail reception module 110 is connected to the communication module 105, and to a detection (A) module 120 and a detection (B) module 125 of the misrepresentation detection module 115. The mail reception module 110 receives email from other devices via the communication module 105. Note that the email received by the mail reception module 110 may be email addressed to a user who uses the information processing device 100, as well as email received by a mail server that relays email. In other words, the information processing device 100 in the former case is a terminal utilized by the user, whereas the information processing device 100 in the latter case is a mail server.

The misrepresentation detection module 115 includes a detection (A) module 120, a detection (B) module 125, a correspondence table storage module 130, a misrepresentation determination module 135, and a misrepresentation handling processing module 140. The misrepresentation detection module 115 detects email misrepresenting the sender from among the email received by the mail reception module 110.

The detection (A) module 120 is connected to the mail reception module 110 and the misrepresentation determination module 135. The detection (A) module 120 detects first sender information from the body text or the subject of an email. For example, the first sender information is a sender domain or an organization name of the sender.

Additionally, the detection (A) module 120 may also be configured to detect an organization name of the sender from the body text or the subject of an email, and from the organization name of the sender, reference a correspondence table between organization names and domains, and detect a first sender domain. For the correspondence table, information stored in the correspondence table storage module 130 may be used.

Additionally, the detection (A) module 120 may also be configured to detect a first organization name from the body text or the subject of an email.

Additionally, the detection (A) module 120 may also detect first sender information from a first location inside the body text or the subject of an email, and detect 2B sender information from a second location different from the first location inside the body text or the subject. Obviously, the "second location" is a location which is inside the body text or the subject, and which is different from the first location. For example, the 2B sender information is a sender domain or an organization name of the sender. Obviously, in the case in which the first sender information is a sender domain, the 2B sender information is also a sender domain, whereas in the case in which the first sender information is an organization name of the sender, the 2B sender information is also an organization name of the sender.

The detection (B) module 125 is connected to the mail reception module 110 and the misrepresentation determination module 135. The detection (B) module 125 detects second sender information from the header of an email. Note that the "header of an email" herein does not include the subject. For example, the second sender information is a sender domain or an organization name of the sender. Obviously, in the case in which the first sender information is a sender domain, the second sender information is also a sender domain, whereas in the case in which the first sender information is an organization name of the sender, the second sender information is also an organization name of the sender. Specifically, the second sender information is information detected from one or more of any of the From field, the Reply-To field, the Return-Path field, and the Received field of an email.

Also, the detection (B) module 125 may be configured to detect a second sender domain from the header of an email.

Also, the detection (B) module 125 may be configured to detect a domain of the sender from the header of an email, and from the domain of the sender, reference a correspondence table between organization names and domains, and detect a second sender organization name. For the correspondence table, information stored in the correspondence table storage module 130 may be used.

The correspondence table storage module 130 is connected to the misrepresentation determination module 135. The correspondence table storage module 130 may also not be inside the information processing device 100. For example, it may be configured so that a query is communicated to a WHOIS server 280, and information equivalent to the correspondence table 600 is acquired.

The misrepresentation determination module 135 is connected to the detection (A) module 120, the detection (B) module 125, the correspondence table storage module 130, and the misrepresentation handling processing module 140. In the case of a mismatch between the first sender information detected from the body text or the subject of an email received by the mail reception module 110 and the second sender information detected from the header of the email, the misrepresentation determination module 135 determines that the email is a misrepresentation. Note that it is sufficient to use information detected by the detection (A) module 120 as the first sender information, and information detected by the detection (B) module 125 as the second sender information.

Herein, the term "detecting" may also include meanings such as deciding, tentatively deciding, estimating, and extracting.

Also, the term "misrepresentation" herein refers to falsely representing the sender (including the organization), and corresponds to cases of creating email in which, even though the sender belongs to Organization B, the email purports that the sender belongs to Organization A which is unrelated to Organization B (or causes the recipient to misinterpret the sender as belonging to Organization A), for example.

In addition, the misrepresentation determination module 135 may also be configured to determine that an email is a misrepresentation in the case of a mismatch between a first sender domain and a second sender domain. Note that it is sufficient to use a domain detected by the detection (A) module 120 as the first sender domain, and a domain detected by the detection (B) module 125 as the second sender domain.

In addition, the misrepresentation determination module 135 may also be configured to determine that an email is a misrepresentation in the case of a mismatch between a first sender information organization name and a second organization name. Note that it is sufficient to use an organization name detected by the detection (A) module 120 as the first sender organization name, and an organization name detected by the detection (B) module 125 as the second sender organization name.

Additionally, the misrepresentation determination module 135 may also be configured to determine that an email is a misrepresentation in the case of a mismatch between first sender information detected from a first location inside the body text or the subject of the email, and 2B sender information detected from a second location different from the first location inside the body text or the subject. Note that it is sufficient to use sender information detected by the detection (A) module 120 as the first sender information and the 2B sender information.

The misrepresentation handling processing module 140 is connected to the misrepresentation determination module 135. In the case of a mismatch between the first sender information detected from the body text or the subject of an email and the second sender information detected from the header of the email, the misrepresentation handling processing module 140 executes a misrepresentation handling process for the email. Note that, regarding whether or not there is a mismatch, it is sufficient to use a determination result from the misrepresentation determination module 135. Also, as the misrepresentation handling process, any one of presenting a warning indicating the misrepresentation, deterring the user from opening the target email, and notifying an administrator may be executed, or a combination of the above may be executed, for example. In particular, as the presentation of a warning, the reason for determining that the email is a misrepresentation may be presented.

Furthermore, in the case in which there is a location in which the first sender information is not detected successfully, and in the case of a mismatch between the first sender information detected from another location and the second sender information, the misrepresentation handling processing module 140 may be configured to present an indication of the possibility of a misrepresentation as the presentation of a warning.

Originally, in the case in which the first sender information is not successfully detected inside the body text or the subject of an email, a mismatch occurs between the first sender information and the second sender information, and thus a misrepresentation is determined. However, a situation may occur in which, for example, "C Corp., D Corp." is stated inside the body text or the subject of an email, and although for "C Corp." there is a match with the second sender information, for "D Corp." an organization name corresponding to D (such as "D" or "D Corp.") or a domain is not registered in the correspondence table, and thus the first sender information is not detected successfully. In this case, there is a high probability that the sender officially belongs to "C Corp.", but since there is also a possibility that the sender is misrepresenting "D Corp.", "the possibility of a misrepresentation" is presented.

Note that the "location in which the first sender information is not detected successfully" corresponds to the statement of "D Corp." inside the body text or the subject of the email described above, for example, while the "other location" corresponds to the statement of "C Corp." described above, for example. A specific description will be given later using the example of FIG. 13.

In addition, the misrepresentation handling processing module 140 may also be configured to execute the misrepresentation handling process for an email in the case of a mismatch between a first sender domain and a second sender domain. Note that it is sufficient to use a domain detected by the detection (A) module 120 as the first sender domain, and a domain detected by the detection (B) module 125 as the second sender domain. Also, regarding whether or not there is a mismatch, it is sufficient to use a determination result from the misrepresentation determination module 135.

In addition, the misrepresentation handling processing module 140 may also be configured to execute the misrepresentation handling process for an email in the case of a mismatch between a first sender information organization name and a second organization name. Note that it is sufficient to use an organization name detected by the detection (A) module 120 as the first sender organization name, and an organization name detected by the detection (B) module 125 as the second sender organization name. Also, regarding whether or not there is a mismatch, it is sufficient to use a determination result from the misrepresentation determination module 135.

Additionally, the misrepresentation handling processing module 140 may also be configured to execute the misrepresentation handling process for an email in the case of a mismatch between first sender information detected from a first location inside the body text or the subject of the email, and 2B sender information detected from a second location different from the first location inside the body text or the subject. Note that it is sufficient to use sender information detected by the detection (A) module 120 as the first sender information and the 2B sender information. Also, regarding whether or not there is a mismatch, it is sufficient to use a determination result from the misrepresentation determination module 135.

Figure 2:
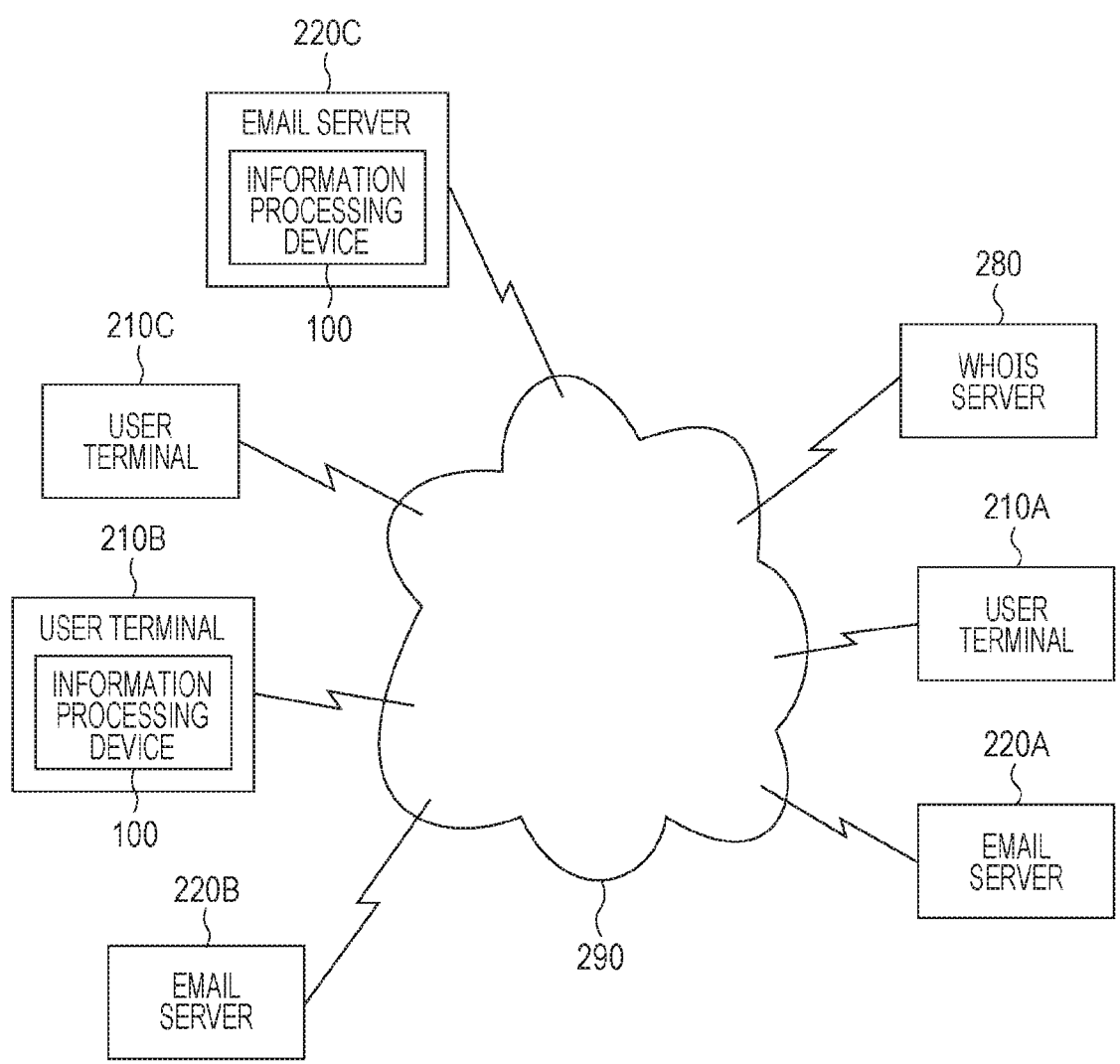
FIG. 2 is an explanatory diagram illustrating an exemplary system configuration utilizing an exemplary embodiment.

FIG. 2 is an explanatory diagram illustrating an exemplary system configuration utilizing an exemplary embodiment;

A user terminal 210A, a user terminal 210B, a user terminal 210C, an email server 220A, an email server 220B, an email server 220C, and a WHOIS server 280 are interconnected via a communication link 290. The user terminal 210B includes the information processing device 100. The email server 220C includes the information processing device 100.

The user terminals 210 correspond to devices used by users to receive email, for example, and may be not only personal computers (including notebook PCs), but also portable information communication equipment (including devices such as mobile phones, smartphones, mobile equipment, and wearable computers), for example.

The email servers 220 correspond to servers such as mail servers of Internet service providers that users are contracted with, mail servers possessed by companies or the like, or webmail servers.

For example, suppose that a mailbox of the user of the user terminal 210A is on the email server 220A, a mailbox of the user of the user terminal 210B is on the email server 220B, and a mailbox of the user of the user terminal 210C is on the email server 220C. In this case, if an email is transmitted from the user of the user terminal 210A to the user of the email server 220B, the information processing device 100 inside the user terminal 210B determines whether or not the email is misrepresented. Also, if an email is transmitted from the user of the user terminal 210A to the user of the email server 220C, the information processing device 100 inside the email server 220C determines whether or not the email is misrepresented, and the result is transmitted to the user of the user terminal 210C.

Figure 3:
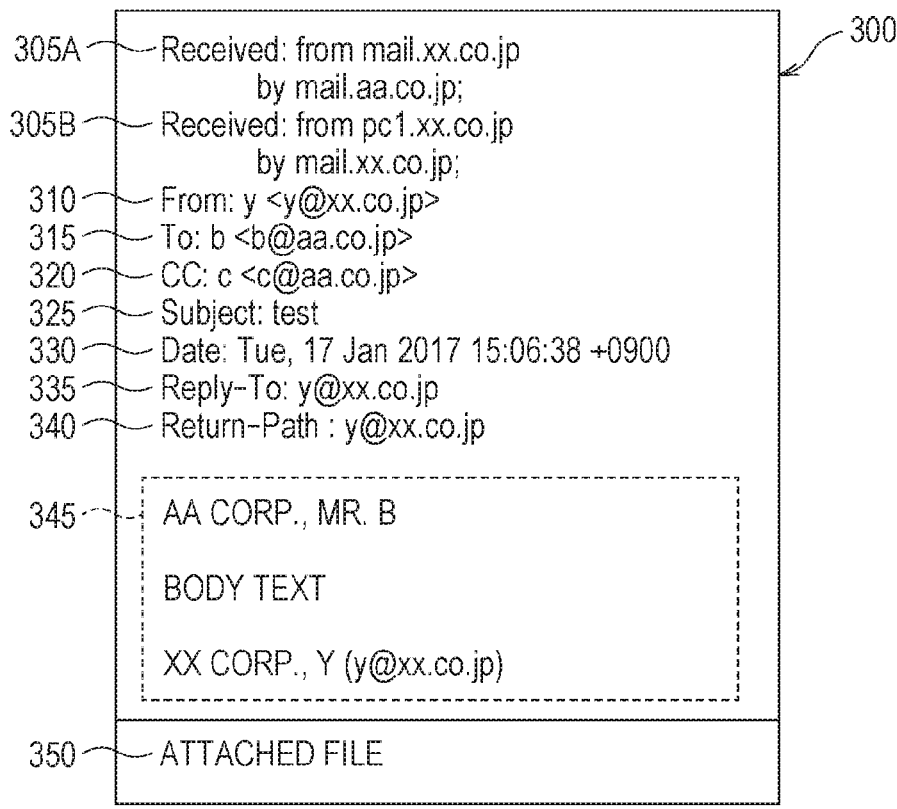
FIG. 3 is an explanatory diagram illustrating an exemplary data structure of an email.

FIG. 3 is an explanatory diagram illustrating an exemplary data structure of an email 300.

Email data is roughly divided into the "header" and the "body text or subject (also called the body)". The header includes accompanying information such as the sender (From) and the recipient (To). The body contains text that acts as the body text of the mail itself, and text that acts as the subject. Note that generally the subject is included in the header, but in the description of the present exemplary embodiment, the subject is not included in the header.

For example, the email 300 includes a Received field 305A, a Received field 305B, a From field 310, a To field 315, a CC field 320, a Subject field 325, a Date field 330, a Reply-To field 335, a Return-Path field 340, a Body Text field 345, and an Attached File field 350.

The Received fields 305 indicate the route by which the email was delivered. The mail server to which the email was delivered first is stated at the bottom, and the mail servers to which the email was delivered next are stated on top in the order of delivery. The example illustrated in FIG. 3 indicates that the email 300 was transmitted from the address "pc1.xx.co.jp" of the sender's user terminal (such as a PC) stated in the Received field 305B, forwarded to the email server "mail.xx.co.jp", and subsequently, as stated in the Received field 305A, transmitted from the email server "mail.xx.co.jp" to the email server "mail.aa.co.jp", and delivered to the receiver's user terminal (such as a PC). In many cases, the domain of the sender is the same as the domain "xx.co.jp" of the mail server to which the email is delivered first. In other words, the domain "xx.co.jp" stated in the "from" part or the "by" part of the Received field 305B (the bottommost Received field 305) is the domain of the sender. Herein, it may be configured that the domain of the sender is decided on the condition that the domain parts in the "from" part and the "by" part match. Meanwhile, in the case in which the domain parts in the "from" part and the "by" part in the Received field 305B do not match, the domain in the "from" part may be decided as the domain of the sender. Also, in the case in which the domain parts in the "from" part and the "by" part in the Received field 305B do not match, the email may be determined to be a misrepresentation. Note that "aa.co.jp" stated in the "by" part of the Received field 305A (the topmost Received field 305) is the domain of the receiver (recipient, destination). Because the Received fields 305 are configured in this way, the by part of the Received field 305B and the from part of the next Received field 305A match under normal circumstances. Consequently, in the case in which the by part of the Received field 305B and the from part of the next Received field 305A do not match, the email may be determined to be a misrepresentation.

Note that in the example illustrated in FIG. 3, there are two Received fields 305, but there may also be three or more.

In the From field 310, the mail address of the source is stated. In the example illustrated in FIG. 3, the address is "y@xx.co.jp". In some cases, this address is falsified to misrepresent the sender.

In the To field 315, the mail address of the recipient is stated. In the example illustrated in FIG. 3, the address is "b@aa.co.jp".

In the CC field 320, the mail address of a carbon copy recipient is stated. In the example illustrated in FIG. 3, the address is "c@aa.co.jp".

In the Subject field 325, the subject is stated. The subject can be an arbitrary text string. In the example illustrated in FIG. 3, the subject is "test".

In the Date field 330, the date and time when the email was transmitted is stated. In the example illustrated in FIG. 3, the date and time is "Tue, 17 Jan. 2017 15:06:38+0900".

In the Reply-To field 335, a reply destination of the email is stated. In the example illustrated in FIG. 3, the address is "y@xx.co.jp". In some cases, this address is falsified to misrepresent the sender.

In the Return-Path field 340, the email address of a return path in case a mail delivery error occurs is stated. In the example illustrated in FIG. 3, the address is "y@xx.co.jp". In some cases, this address is falsified to misrepresent the sender.

In the Body Text field 345, the body text is stated. In the example illustrated in FIG. 3, the body text is stated as follows.

> AA Corp., Mr. B
> Body Text
> XX Corp., Y (y@xx.co.jp)

In the Attached File field 350, an attached file is stated. Specifically, the email is called a multi-part email, in which a Content-Type field in the header is set to "multipart/mixed". Additionally, the attached file is converted to text (encoded), and embedded into the email body text. Note that an attached file may also be included as the body text.

Figure 4:
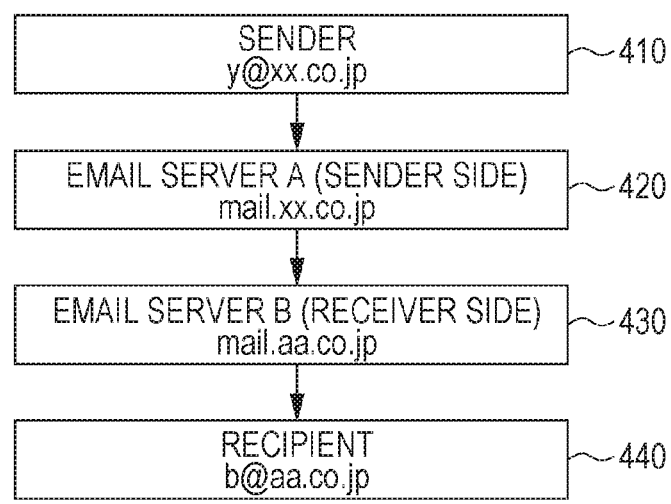
FIG. 4 is an explanatory diagram illustrating an exemplary delivery route of an email.

FIG. 4 is an explanatory diagram illustrating an exemplary delivery route of an email. The delivery route for the example of FIG. 3 is illustrated.

For example, taking the correspondences with the transmission example indicated in the description of FIG. 2, a sender 410 corresponds to the user terminal 210A, an email server A (sender side) 420 corresponds to the email server 220A, an email server B (receiver side) 430 corresponds to the user terminal 210B or the user terminal 210C, and a destination 440 corresponds to the email server 220B or the email server 220C.

As the delivery route of the email 300, the email 300 is transmitted by the sender 410, namely "y@xx.co.jp" (as for the user terminal, "pc1.xx.co.jp" in the from part of the From field 310B), forwarded first to the email server A (sender side) 420, namely "mail.xx.co.jp" (the by part of the Received field 305B), forwarded next to the email server B (receiver side) 430, namely "mail.aa.co.jp" (the by part of the Received field 305A), and finally received by the destination 440, namely "b@aa.co.jp" (the To field 315).

Figures 5, 6:
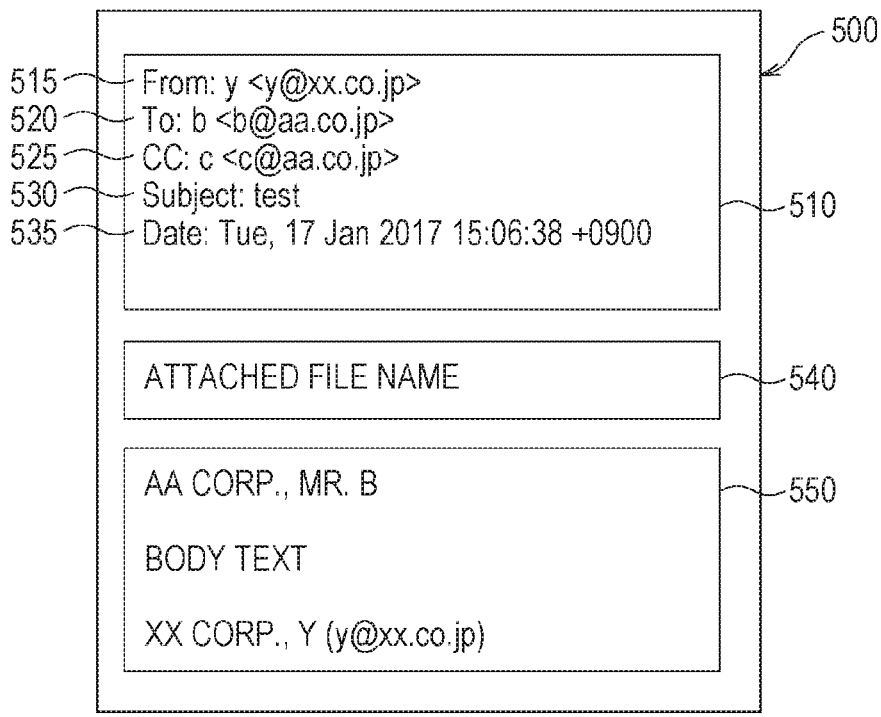
FIG. 5 is an explanatory diagram illustrating an example of displaying a received email on a screen with an email tool.
FIG. 6 is an explanatory diagram illustrating an exemplary data structure of a correspondence table.

FIG. 5 is an explanatory diagram illustrating an example of displaying a received email on a screen with an email tool.

On a screen 500, a header and other information display area 510, an attached file name display area 540, and a body text display area 550 are displayed.

The header and other information display area 510 includes a From field display section 515, a To field display section 520, a CC field display section 525, a Subject field display section 530, and a Date field display section 535.

In the From field display section 515, the content of the From field 310 is displayed.

In the To field display section 520, the content of the To field 315 is displayed.

In the From field display section 515, the content of the CC field 320 is displayed.

In the Subject field display section 530, the content of the Subject field 325 is displayed.

In the Date field display section 535, the content of the Date field 330 is displayed.

In the attached file name display area 540, the file name in the Attached File field 350 is displayed.

In the body text display area 550, the content of the Body Text field 345 is displayed.

Note that in the ordinary display mode of many email tools, the content of the From field, the content of the To field, the content of the CC field, the content of the Subject field, the content of the Date field, the attached file name, and the content of the Body Text field are displayed, while the content of the Received field, the content of the Reply-to field, and the content of the Return-Path field are not displayed. Consequently, it is difficult for a user receiving an email (particularly, a general user) to reference information such as the Received field, and determine whether or not the email is a misrepresentation.

FIG. 6 is an explanatory diagram illustrating an exemplary data structure of the correspondence table 600. The correspondence table 600 is an example of a correspondence table between organization names and domains.

The correspondence table 600 includes an organization name field 610, a domain name field 620, and a telephone number field 630. The organization name field 610 stores organization names. The domain name field 620 stores domains possessed by the organization with each organization name. The telephone number field 630 stores a telephone number of the organization with each organization name. With the correspondence table 600, various conversions are possible, such as the conversion from organization name to domain, the conversion from domain to organization name, or the conversion from telephone number to domain.

The organization names and domains of prominent companies likely to be misrepresented may be registered in advance in the correspondence table 600.

The correspondence table 600 may be created by the user, or created by the misrepresentation determination module 135 extracting information from the WHOIS server 280. It is sufficient for the correspondence table 600 to be created before the process according to the flowchart illustrated in the example of FIGS. 7A and 7B. The correspondence table 600 may be stored in the correspondence table storage module 130 of the relevant information processing device 100. Alternatively, the correspondence table 600 may be stored in an external server, and the correspondence table 600 in the external server may be accessed by the relevant information processing device 100. In addition, the misrepresentation determination module 135 may also not use the correspondence table storage module 130, and instead search the WHOIS server 280 every time the misrepresentation determination module 135 determines whether or not an email is a misrepresentation.

Domain names are managed by a registry (registration management organization). This registry corresponds to the Japan Registry Services Co., Ltd. (JPRS) for the ccTLD ".jp", and to the American company VeriSign, Inc. for ".com". Accordingly, instead of creating the correspondence table 600 by oneself, a whois service (domain name registration information searching service, WHOIS server 280) provided by a registry may be used. The URLs of whois services are listed below. http://whois.jprs.jp/http://registrar.verisign-grs.com/webwhois-ui/index.jsp As described above, since the distinguishing between legitimacy and misrepresentation for an email is not executed using the correspondence table 600 alone, the correspondence table 600 may include legitimate data and misrepresenting data. Consequently, the creation of a correspondence table is easier than registering only legitimate data.

In particular, if a whois service provided by a registry (registration management organization) that manages domains is utilized, it is not necessary to create the correspondence table by oneself.

Note that it may also be configured so that only legitimate data is registered in the correspondence table 600. Additionally, when looking up a correspondence between an organization name and a domain, a misrepresentation is determined if a correspondence is not registered in the correspondence table 600. In this case, misrepresentations can be determined more accurately.

Figure 7A:
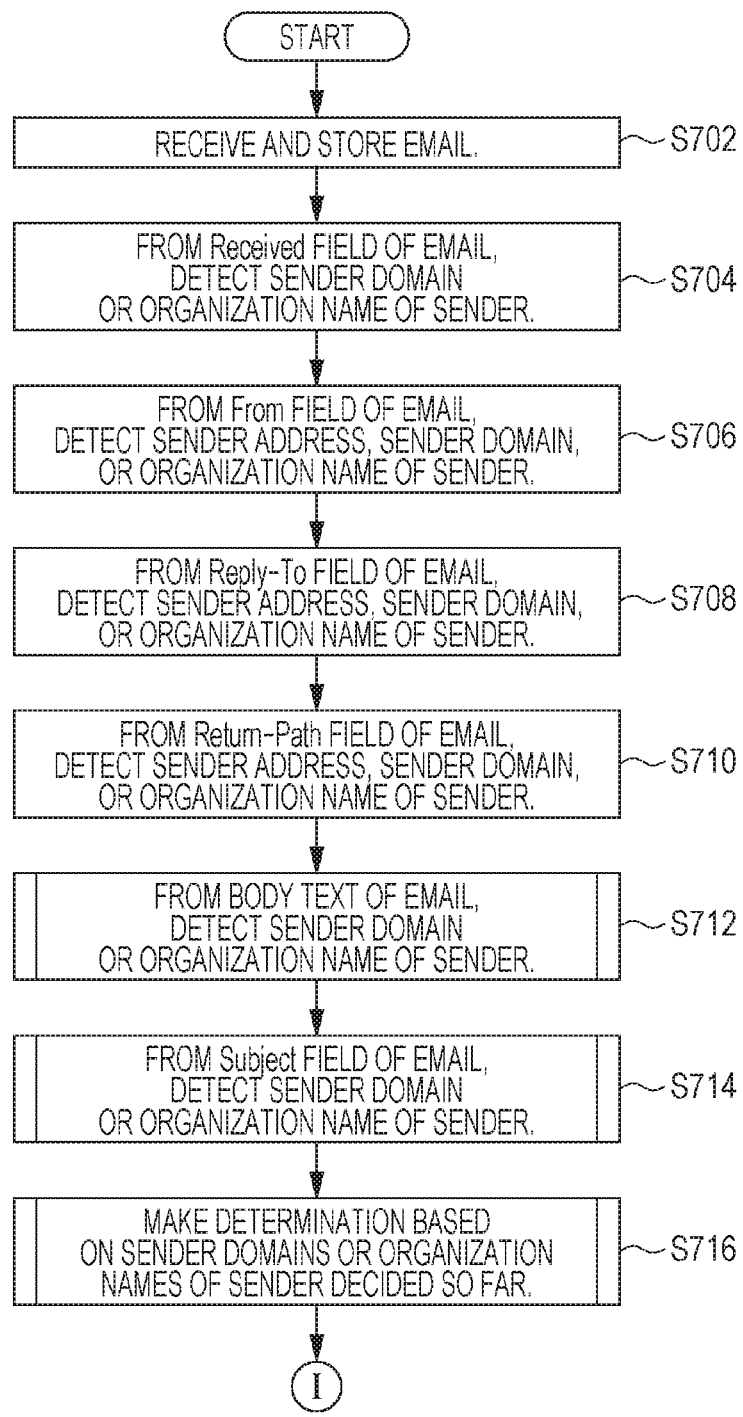
FIG. 7A is a flowchart illustrating an example process according to an exemplary embodiment.

FIGS. 7A and 7B are flowcharts illustrating an exemplary process according to the exemplary embodiment.

In step S702, an email is received and stored.

In step S704, a sender domain or an organization name of the sender is detected from the Received field of the email.

In step S704, an example is illustrated in which a domain of the sender is detected from the address of the mail server (the by part) stated at the bottom of the Received field of the email. For example, in the case in which the address of the mail server stated at the bottom is "mail.sub1.xxx.co.jp", the sender domain is detected as "xxx.co.jp". This is because the mail server stated at the bottom is the mail server that first relayed the email during transmission, and thus is a mail server close to the sender, and the domain of the mail server is estimated to be the domain to which the sender belongs. Note that, as described above, a domain of the sender may also be detected from the address of the mail server (the from part) stated at the bottom of the Receiver field, and the domain of the sender may be decided under the condition that the domains in the by part and the from part match. Subsequently, the correspondence table 600 illustrated in the example of FIG. 6 is used to detect the organization name "XXX" of the sender from the sender domain. Specifically, it is sufficient to search the domain name field 620 for "xxx.co.jp", and detect the organization name "XXX" from the corresponding organization name field 610.

In step S706, a sender address, a sender domain, or an organization name of the sender is detected from the From field of the email.

In step S708, a sender address, a sender domain, or an organization name of the sender is detected from the Reply-To field of the email.

In step S710, a sender address, a sender domain, or an organization name of the sender is detected from the Return-Path field of the email.

The processes from step S706 to step S710 will be described using an example. An email address is stated respectively in the From field, the Reply-To field, and the Return-Path field. The email address is detected as the sender address. For example, in the case in which the email address is "nnn@sub1.xxx.co.jp", the sender domain is detected as "xxx.co.jp". Subsequently, the correspondence table 600 illustrated in the example of FIG. 6 is used to detect the organization name "XXX" of the sender from the sender domain.

In step S712, a sender domain or an organization name of the sender is detected from the Received field of the email.

With only the information obtained from the Received field, the From field, the Reply-To field, and the Return-Path field of an email, a misrepresenting email may go undetected in some cases. Accordingly, in the process from step S712, information obtained from the body text and the Subject field of an email is also used to detect that an email is misrepresenting the sender.

The detailed process in step S712 will be described later using the flowchart illustrated in the example of FIG. 8 or 9. The process in either one of the flowchart illustrated in the example of FIG. 8 and the flowchart illustrated in the example of FIG. 9 may be executed, or both processes may be executed.

In step S714, a sender domain or an organization name of the sender is detected from the Subject field of the email.

In the Subject field of an email, an arbitrary text string can be stated, similarly to the body text.

In particular, an organization name (company name) or domain of the sender is sometimes stated in the Subject field to draw the attention of the person reading the email.

Accordingly, by performing a process similar to the process on the body text, a sender domain or an organization name is detected from the Subject field of the email.

Figure 8:
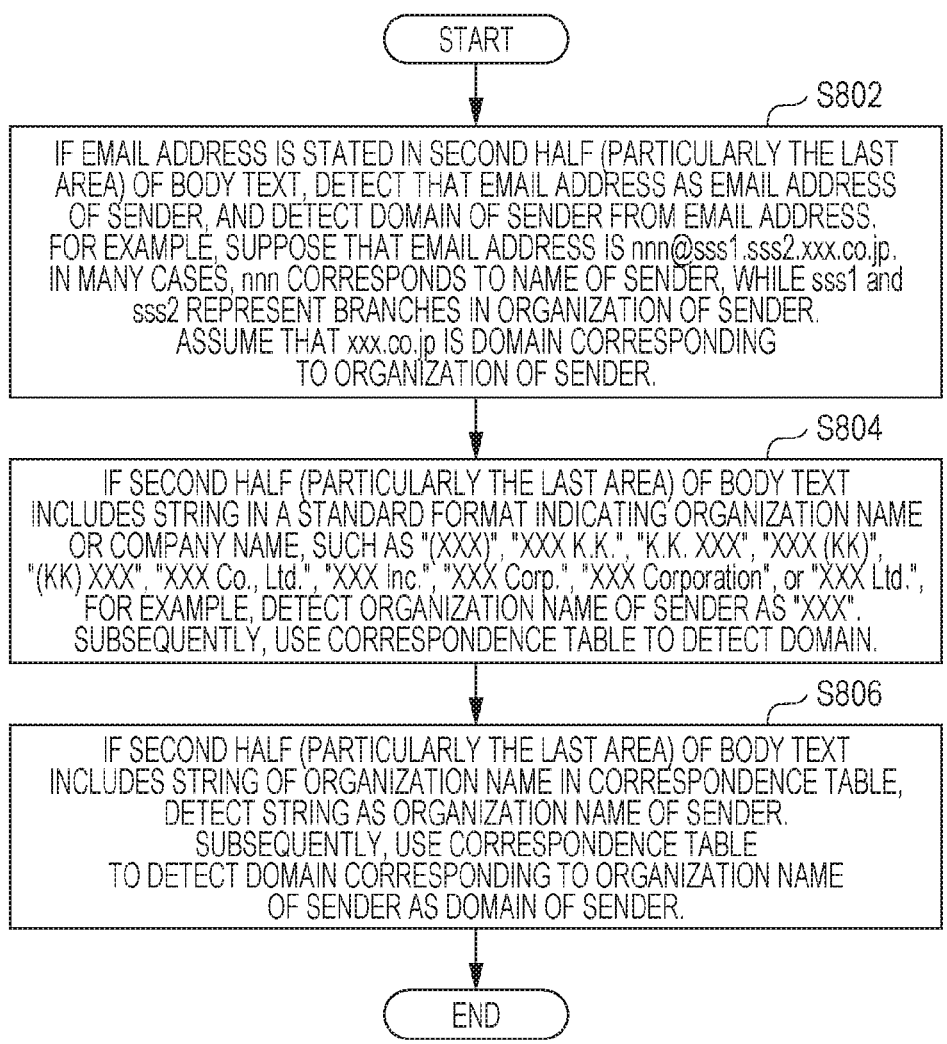
FIG. 8 is a flowchart illustrating an example process according to an exemplary embodiment.
Figure 9:
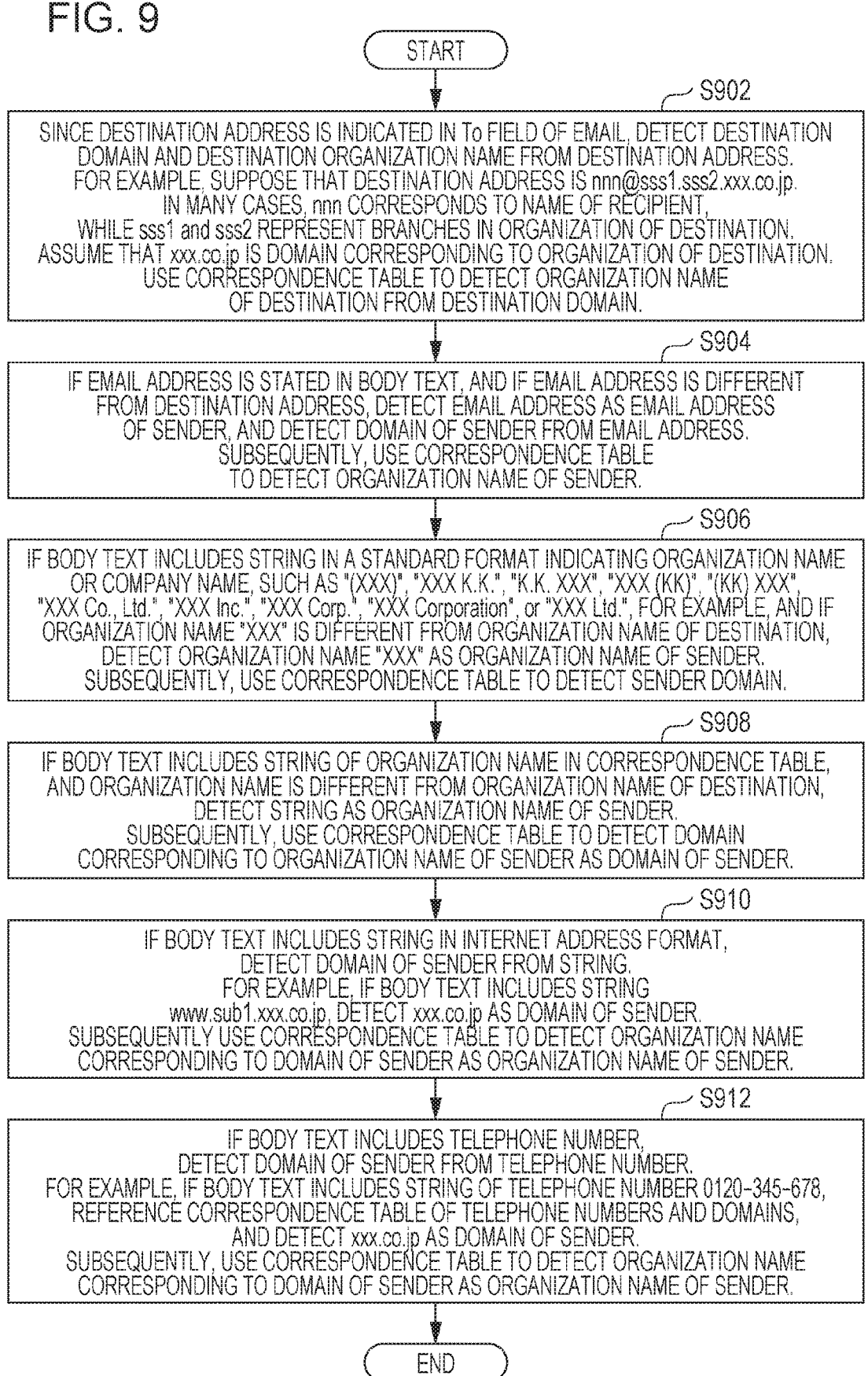
FIG. 9 is a flowchart illustrating an example process according to an exemplary embodiment.

Regarding the detailed process in step S714, it is sufficient to replace "body text" with "Subject field" as the target of extraction in the flowchart illustrating in the example of FIG. 8 or 9. The process targeting the Subject field in either one of the flowchart illustrated in the example of FIG. 8 and the flowchart illustrated in the example of FIG. 9 may be executed, or both processes may be executed.

In step S716, on the basis of the sender domains or organization names of the sender detected so far, a match determination of the sender domains or the organization names of the sender is executed. The detailed process in step S716 will be described later using the flowchart illustrated in the example of FIG. 10.

In step S718, it is determined whether or not there is a match by all conditions in step S716, and in the case of a match by all conditions, the flow proceeds to step S720. Otherwise, the flow proceeds to step S724. Note that in this example, "it is determined whether or not there is a match by all conditions in step S716", but this may be treated as predetermined conditions (conditions which are at least fewer than "all conditions") being satisfied, a predetermined number of conditions being satisfied, or a predetermined ratio of conditions (a ratio of the number of matching conditions with respect to the number of inspected conditions) being satisfied, or the like. For example, in the case of demanding that all of the sender domains or the organization names of the sender detected from the header match (specifically, steps S1002 and S1004), and targeting multiple sender domains or organization names of the sender detected from the body text or the subject (specifically, steps S1006 to S1014), the above determination may be treated as predetermined conditions being satisfied (specifically, any one or more of steps S1006 to S1014), a predetermined number of conditions being satisfied, or a predetermined ratio of conditions being satisfied, or the like.

For example, the above determination may be configured to include at least a condition that "the sender domains or organization names of the sender detected from the header" match (specifically, step S1002 or step S1004), and a condition that "the sender domains or organization names of the sender detected from the header" and "multiple sender domains or organization names of the sender detected from the body text or the subject" match (specifically, step S1012 or step S1014).

In step S720, it is determined that the email is not misrepresented.

In step S722, a normal email process is executed. For example, the following process is executed. In accordance with a user instruction, the email is opened and displayed on a screen.

In step S724, it is determined that the email is misrepresented.

In step S726, a process for misrepresented email (misrepresentation handling process) is performed. For example, the following process is executed. (1) The following warning is displayed: "This email is misrepresented. The domain detected from the subject or body text of the email is different from the domain detected from the header of the email." The content of the warning may also include the reason for determining that the email is a misrepresentation. Specifically, the conditions that did not match may be presented. (2) The user is deterred from opening the email. For example, the email is deleted, moved to another folder, or a flag indicating that the email is a misrepresenting email is attached, and an opening process is made unavailable. (3) The administrator of the email system is notified. The notification may be issued as a notification using email, chat, or social media, as a push notification, or as a telephone call by interactive voice response, for example. In addition, the email determined to be a misrepresentation may also be forwarded to the administrator.

FIG. 8 is a flowchart illustrating an exemplary process according to the present exemplary embodiment, and is an example of the process (first process) in step S712 of the flowchart illustrating in the example of FIGS. 7A and 7B. Specifically, the process is a process of detecting an organization name or a domain of the sender from the body text.

Generally, in many cases, the organization name (including a company name or the like, for example) and the personal name of the recipient are written in the first half of the body text, while the organization name (including a company name or the like, for example) and the personal name of the sender are written in the second half of the body text. Particularly, in many cases, the organization name and the personal name of the recipient are written in the first area of the body text, while the organization name and the personal name of the sender are written in the last area of the body text (also referred to as the signature which is stated at the end of the email).

Among the processes below, all processes may be performed, or only a selected process or processes may be performed.

In step S802, in the case in which an email address is stated in the second half (particularly the last area) of the body text, the email address is detected as the email address of the sender, and a domain of the sender is detected from the email address.

For example, suppose that the detected email address is "nnn@sss1.sss2.xxx.co.jp". In many cases, "nnn" corresponds to the name of the sender, while "sss1" and "sss2" represent branches in the organization of the sender. Assume that "xxx.co.jp" is a domain corresponding to the organization of the sender. Subsequently, the correspondence table 600 is used to detect the organization name "XXX" corresponding to the domain as the organization name of the sender.

In step S804, in the case in which the second half (particularly the last area) of the body text includes a text string in a standard format indicating an organization name or a company name, such as "(XXX)", "XXX K.K.", "K.K. XXX", "XXX (KK)", "(KK) XXX", "XXX Co., Ltd.", "XXX Inc.", "XXX Corp.", "XXX Corporation", or "XXX Ltd.", for example, the organization name of the sender is detected as "XXX". Specifically, as the process of detecting the organization name, a pattern matching string using a regular expression may be defined, and a search process may be executed. Additionally, natural language processing may be used to detect the organization name as a proper noun. Subsequently, the correspondence table 600 is used to detect the domain "xxx.co.jp" corresponding to the organization name of the sender as the domain of the sender.

In step S806, in the case in which a text string of an organization name in the correspondence table 600 (the organization name field 610) illustrated in the example of FIG. 6 is included in the second half (particularly the last area) of the body text, the text string is detected as an organization name of the sender. Subsequently, the correspondence table 600 is used to detect the domain corresponding to the organization name of the sender as a domain of the sender.

Note that, for example, the "second half of the body text" may be treated as the text in a predetermined number of lines (such as 5 lines, for example) from the end of the body text, as the email address or the organization name discovered first in a search performed from the end of the body text, or as the area following a predetermined text string (for example, a text string of repeating characters such as "-" or "*" used as the delimiter of the signature).

FIG. 9 is a flowchart illustrating an exemplary process according to the present exemplary embodiment, and is an example of the process (second process) in step S712 of the flowchart illustrating in the example of FIGS. 7A and 7B. Specifically, the process is a process of detecting an organization name or a domain of the sender from the body text.

Generally, in the body text, the organization name (company name) and personal name of the recipient as well as the organization name (company name) and personal name of the sender are stated, while the organization name (company name) and personal name of a third part are not stated in many cases. Consequently, among the organization names stated in the body text, an organization name that is different from the organization name of the destination can be treated as the organization name of the sender.

Among the processes below, all processes may be performed, or only a selected process or processes may be performed.

In step S902, since the destination address is indicated in the To field of the email, the destination domain and the destination organization name are detected from the destination address. For example, suppose that the destination address is "nnn@sss1.sss2.xxx.co.jp". In many cases, "nnn" corresponds to the name of the recipient, while "sss1" and "sss2" represent branches in the organization of the destination. Assume that "xxx.co.jp" is a domain corresponding to the organization of the destination. Subsequently, the correspondence table 600 is used to detect the organization name "XXX" corresponding to the domain of the destination as the organization name of the destination.

In step S904, in the case in which an email address is stated in the body text, and the email address is different from the destination address, the email address is detected as the email address of the sender, and the domain of the sender is detected from the email address. Subsequently, the correspondence table 600 is used to detect the organization name corresponding to the domain as the organization name of the sender.

In step S906, in the case in which the body text includes a text string in a standard format indicating an organization name or a company name, such as "(XXX)", "XXX K.K.", "K.K. XXX", "XXX (KK)", "(KK) XXX", "XXX Co., Ltd.", "XXX Inc.", "XXX Corp.", "XXX Corporation", or "XXX Ltd.", for example, if the organization name "XXX" is different from the organization name of the destination detected in step S902, the organization name "XXX" is detected as the organization name of the sender. Specifically, as the process of detecting the organization name, a pattern matching string using a regular expression may be defined, and a search process may be executed. Additionally, natural language processing may be used to detect the organization name as a proper noun. Subsequently, the correspondence table 600 is used to detect the domain "xxx.co.jp" corresponding to the organization name of the sender as the sender domain.

In step S908, if a text string of an organization name in the correspondence table 600 (the organization name field 610) illustrated in the example of FIG. 6 is included in the body text, and if the organization name is different from the organization name of the destination detected in step S902, the text string is detected as the organization name of the sender. Subsequently, the correspondence table 600 is used to detect the domain corresponding to the organization name of the sender as a domain of the sender.

In step S910, in the case in which a text string in an Internet address format (including a link using an <a> tag, for example) is included in the body text, the domain of the sender is detected from the text string. For example, in the case in which the text string "www.sub1.xxx.co.jp" is included in the body text, "xxx.co.jp" is detected as the domain of the sender. Subsequently, the correspondence table 600 is used to detect the organization name "XXX" corresponding to the domain of the sender as the organization name of the sender.

This is because in some cases, to enable the user reading an email to utilize an external web server or the like more easily, the address of the server is included in the body text. In this case, generally, the server is a server inside the organization of the sender.

In step S912, in the case in which a telephone number is included in the body text, the domain of the sender is detected from the telephone number. For example, in the case in which the telephone number "0120-345-678" is included in the body text, the correspondence table 600 is referenced, and "xxx.co.jp" is detected as the domain of the sender. Subsequently, the correspondence table 600 is used to detect the organization name "XXX" corresponding to the domain of the sender as the organization name of the sender.

This is because in some cases, to enable the user reading an email to make contact by telephone more easily, the telephone number is included in the body text. In this case, generally, the telephone number is a telephone number of the sender.

Figure 10:
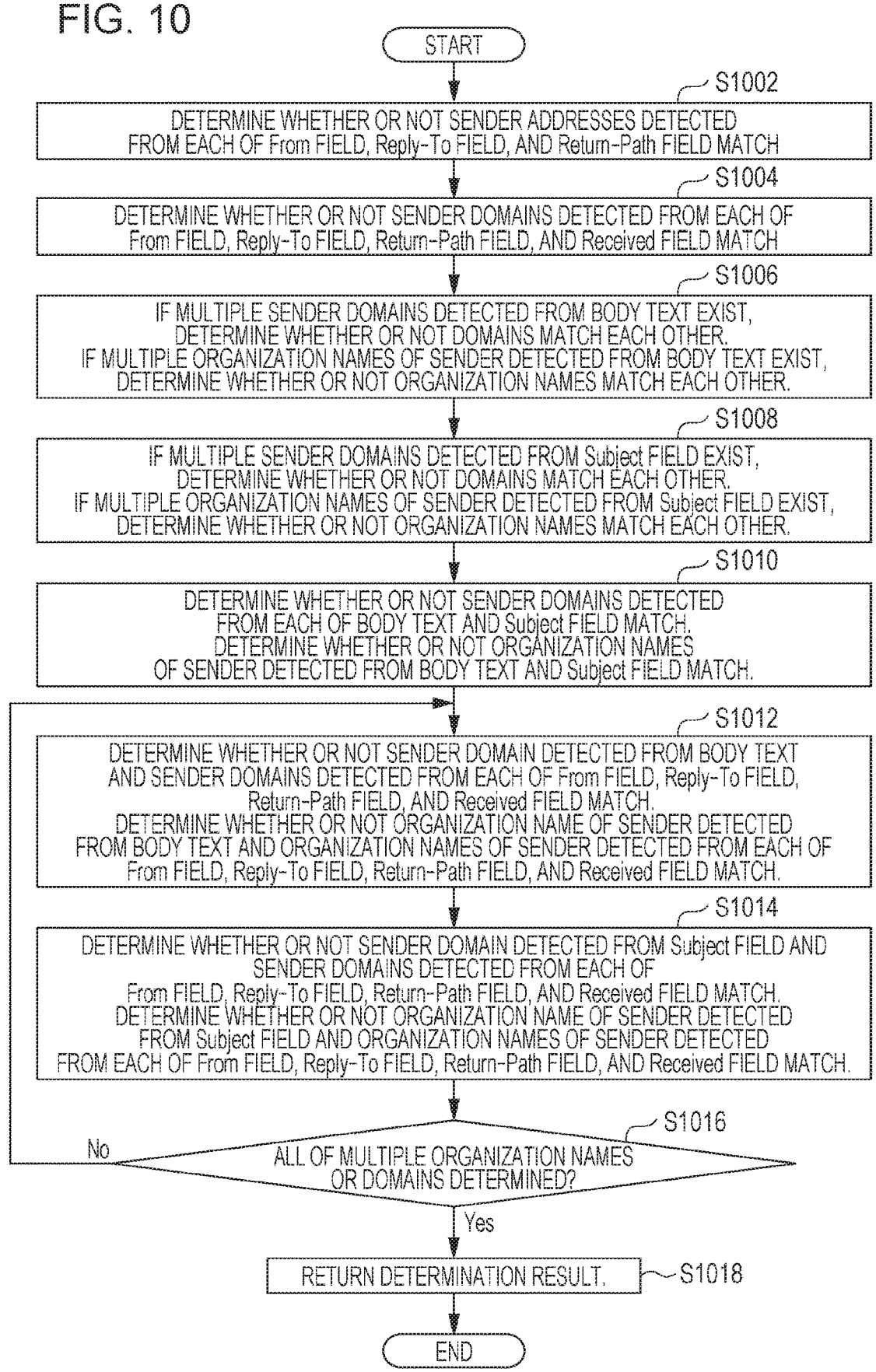
FIG. 10 is a flowchart illustrating an example process according to an exemplary embodiment.

FIG. 10 is a flowchart illustrating an exemplary process according to the present exemplary embodiment, and is an example of the process in step S716 of the flowchart illustrating in the example of FIGS. 7A and 7B.

Among the processes below, all processes may be performed, or only a selected process or processes (the processes in the steps of the conditions used by the determination in step S718) may be performed.

In step S1002, it is determined whether or not the sender addresses detected from each of the From field, the Reply-To field, and the Return-Path field match.

In step S1004, it is determined whether or not the sender domains detected from each of the From field, the Reply-To field, the Return-Path field, and the Received field match. The Received field is added as a target in the determination process of step S1002. Herein, as described above, in the case in which the domain parts in the "from" part and the "by" part in the Received field on the bottom do not match, it may be determined that the sender domains do not match.

In step S1006, in the case in which multiple sender domains detected from the body text exist, it is determined whether or not these multiple sender domains match each other. Alternatively, in the case in which multiple organization names of the sender detected from the body text exist, it is determined whether or not these multiple organization names of the sender match each other.

In step S1008, in the case in which multiple sender domains detected from the Subject field exist, it is determined whether or not these multiple sender domains match each other. Alternatively, in the case in which multiple organization names of the sender detected from the Subject field exist, it is determined whether or not these multiple organization names of the sender match each other.

In step S1010, it is determined whether or not the sender domains detected from each of the body text and the Subject field match. Alternatively, it is determined whether or not the organization names of the sender detected from each of the body text and the Subject field match.

In step S1012, it is determined whether or not the sender domain detected from the body text and the sender domains detected from each of the From field, the Reply-To field, the Return-Path field, and the Received field match. Alternatively, it is determined whether or not the organization name of the sender detected from the body text and the organization names of the sender detected from each of the From field, the Reply-To field, the Return-Path field, and the Received field match.

In step S1014, it is determined whether or not the sender domain detected from the Subject field and the sender domains detected from each of the From field, the Reply-To field, the Return-Path field, and the Received field match. Alternatively, it is determined whether or not the organization name of the sender detected from the Subject field and the organization names of the sender detected from each of the From field, the Reply-To field, the Return-Path field, and the Received field match.

In step S1016, it is determined whether or not all of the multiple organization names or domains have been determined, and in the case in which all have been determined, the flow proceeds to step S1018. Otherwise, the flow returns to step S1012. In the process of detecting a sender domain or an organization name of the sender from the body text or the Subject field (the process of step S712 or S714 in the flowchart illustrated in the example of FIGS. 7A and 7B), multiple sender domains or organization names of the sender are detected in some cases. In this case, all of the detected sender domains or organization names of the sender are used to determine a match or not. Obviously, in the case in which there is only one sender domain or organization name of the sender, the flow proceeds to step S1018.

In step S1018, a determination result is returned. The respective determination results from step S1002 to step S1014 are returned as the determination result.

Note that although there may be multiple determination results from step S1012 and step S1014, a determination result is returned for each sender domain or organization name of the sender being targeted.

In the process of detecting a sender domain or an organization name of the sender from the body text or the Subject field (the process of step S712 or S714 in the flowchart illustrated in the example of FIGS. 7A and 7B), a sender domain or an organization name of the sender is not detected in some cases. In this case, it is sufficient to execute only the available determination processes from step S1006 to step S1014 in the flowchart illustrated in the example of FIG. 10. The detected organization names and domains are used to determine a match or not.

Figure 11:
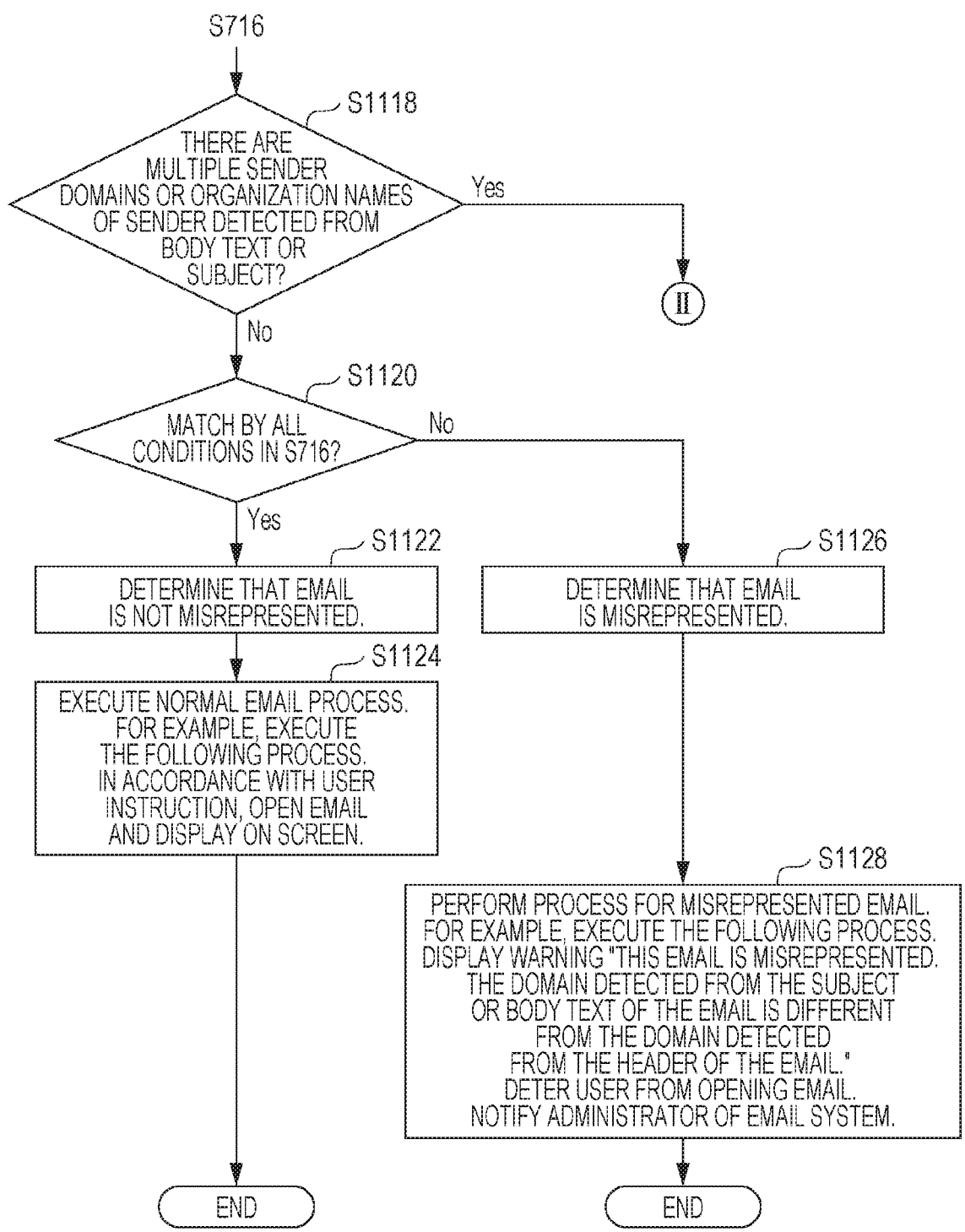
FIG. 11 is a flowchart illustrating an example process according to an exemplary embodiment.
Figure 12:
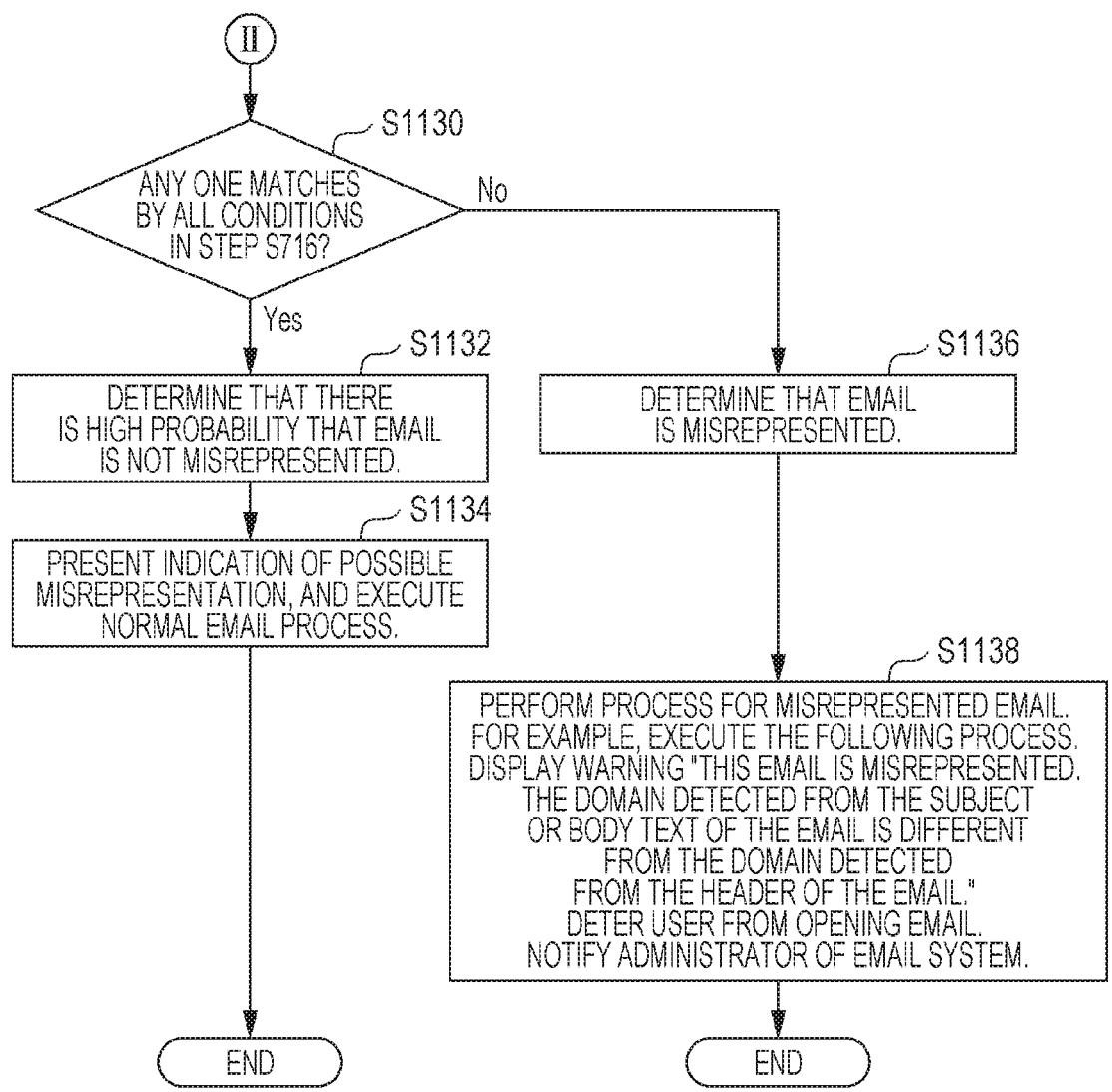
FIG. 12 is a flowchart illustrating an example process according to an exemplary embodiment.
Figure 13:
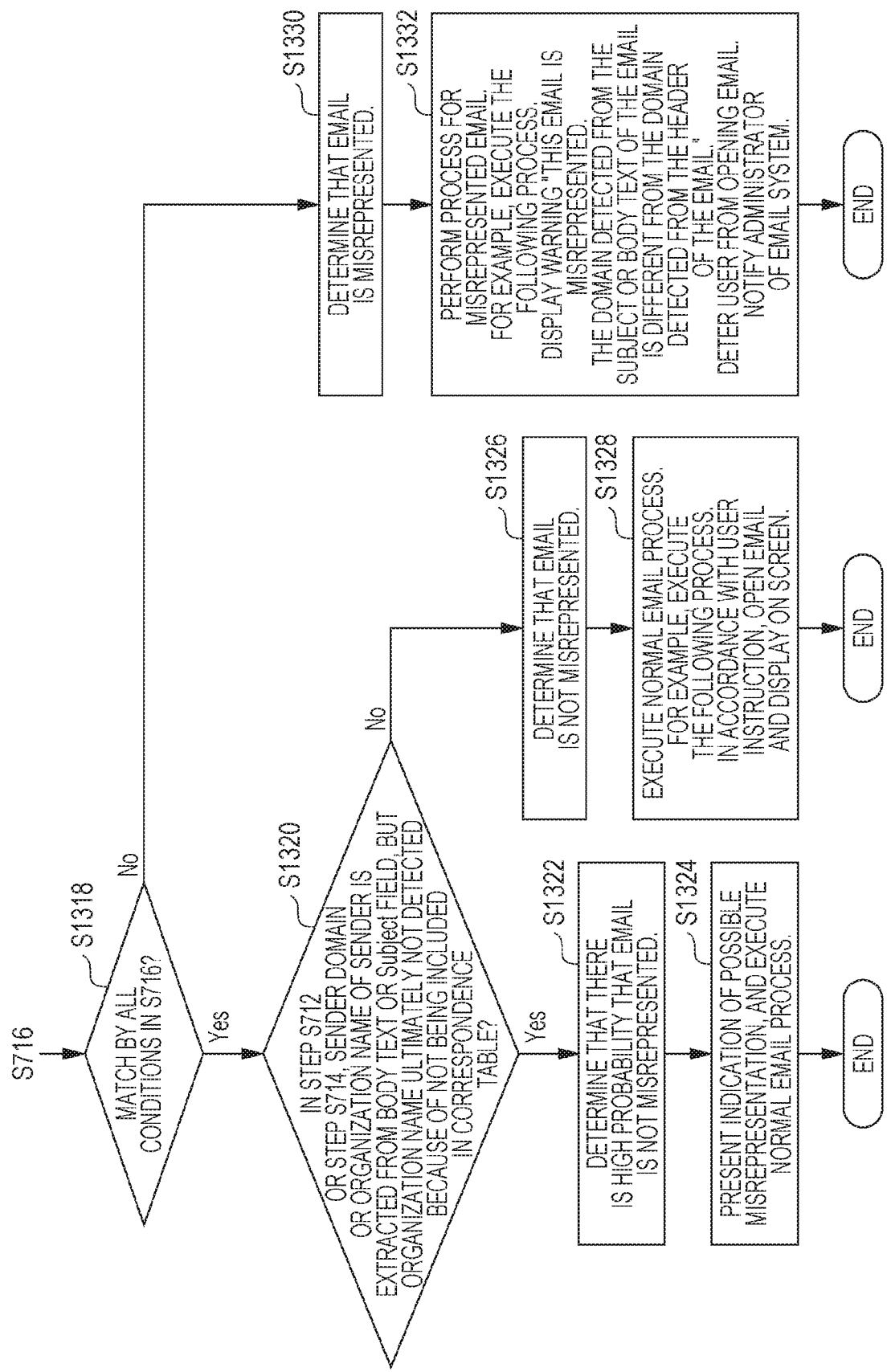
FIG. 13 is a flowchart illustrating an example process according to an exemplary embodiment.

The process from step S718 in the flowchart illustrated in the example of FIGS. 7A and 7B may be replaced with the flowchart illustrated in the example of FIGS. 11 and 12 or the flowchart illustrated in the example of FIG. 13. FIGS. 11 and 12 are flowcharts illustrating an exemplary process according to the exemplary embodiment.

In step S1118, it is determined whether or not there are multiple sender domains or organization names of the sender detected from the body text or the subject (Subject field), and if so, the flow proceeds to step S1130. Otherwise, the flow proceeds to step S1120. Specifically, in the case in which there are multiple "sender domains detected from the body text", "organization names of the sender detected from the body text", "sender domains detected from the subject", or "organization names of the sender detected from the subject", the flow proceeds to step S1130. Otherwise, the flow proceeds to step S1120.

In step S1120, it is determined whether or not there is a match by all conditions in step S716, and in the case of a match by all conditions, the flow proceeds to step S1122. Otherwise, the flow proceeds to step S1126. This is a process similar to step S718.

In step S1122, it is determined that the email is not misrepresented. This is a process similar to step S720.

In step S1124, the normal email process is executed. This is a process similar to step S722. For example, the following process is executed. In accordance with a user instruction, the email is opened and displayed on a screen.

In step S1126, it is determined that the email is misrepresented. This is a process similar to step S724.

In step S1128, a process for misrepresented email is performed. This is a process similar to step S726. For example, the following process is executed. The following warning is displayed: "This email is misrepresented. The domain detected from the subject or body text of the email is different from the domain detected from the header of the email." The user is deterred from opening the email. The administrator of the email system is notified.

In step S1130, it is determined whether or not any one among the multiple sender domains or organization names of the sender detected from the body text or the subject matches by all conditions in step S716, and if so, the flow proceeds to step S1132. Otherwise, the flow proceeds to step S1136. In the case of proceeding to step S1136, not all of the multiple sender domains or organization names of the sender detected from the body text or the subject may satisfy the condition of "matching by all conditions in step S716" in some cases. Note that a case in which all of the multiple sender domains or organization names of the sender detected from the body text or the subject match all conditions in step S716 does not occur. This is because, although multiple sender domains or organization names of the sender have been detected from the body text or the subject, only one sender domain or organization name of the sender has been detected from the header. In the case in which multiple sender domains or organization names of the sender are detected from the header, the conditions in steps S1002 and S1004 are not satisfied. Consequently, in step S1012 or in step S1014, even though one sender domain or organization name of the sender has been detected from the header, the one sender domain or organization name of the sender does not match the multiple sender domains or organization names of the sender detected from the body text or the subject.

In step S1132, it is determined that there is a high probability that the email is not misrepresented. In other words, the possibility that the email is misrepresented has not been ruled out.

In step S1134, an indication of the possibility that the email is misrepresented is presented, and the normal email process (step S1124) is executed.

In step S1136, it is determined that the email is misrepresented. This is a process similar to step S724.

In step S1138, a process for misrepresented email is performed. This is a process similar to step S726. For example, the following process is executed. The following warning is displayed: "This email is misrepresented. The domain detected from the subject or body text of the email is different from the domain detected from the header of the email." The user is deterred from opening the email. The administrator of the email system is notified.

The process from step S718 in the flowchart illustrated in the example of FIGS. 7A and 7B may be replaced with the flowchart illustrated in the example of FIG. 13. FIG. 13 is a flowchart illustrating an exemplary process according to the exemplary embodiment.

Additionally, the flowchart illustrated in the example of FIGS. 11 and 12 may be combined with the flowchart illustrated in the example of FIG. 13. For example, after determining Yes in step S1120, the process from step S1320 may be added.

In step S1318, it is determined whether or not there is a match by all conditions in step S716, and in the case of a match by all conditions, the flow proceeds to step S1320. Otherwise, the flow proceeds to step S1330. This is a process similar to step S718.

In step S1320, it is determined whether or not there is a sender domain or an organization name of the sender which has been extracted from the body text or the Subject field in step S712 or step S714, but is not in the correspondence table 600, and thus ultimately it is determined that an organization name is not detected successfully. In the case in which there is an organization name which has not been detected successfully, the flow proceeds to step S1322. Otherwise, the flow proceeds to step S1326. An example of the case of proceeding to step S1322 is the case in which the organization name "AA" is extracted from the header while "AA Corp." and "BB Corp." are stated in the body text, and although "AA" is included in the correspondence table 600, "BB" is not included. In other words, there is a high probability that an official email from "AA Corp." has been received, but since the possibility that the email is misrepresenting the sender as "BB Corp." has not been ruled out, the flow proceeds to step S1322.

In step S1322, it is determined that there is a high probability that the email is not misrepresented. This is a process similar to step S1132.

In step S1324, an indication of the possibility that the email is misrepresented is presented, and the normal email process is executed. This is a process similar to step S1134.

In step S1326, it is determined that the email is not misrepresented. This is a process similar to step S720.

In step S1328, the normal email process is executed. This is a process similar to step S722. For example, the following process is executed. In accordance with a user instruction, the email is opened and displayed on a screen.

In step S1330, it is determined that the email is misrepresented. This is a process similar to step S724.

In step S1332, a process for misrepresented email is performed. This is a process similar to step S726. For example, the following process is executed. The following warning is displayed: "This email is misrepresented. The domain detected from the subject or body text of the email is different from the domain detected from the header of the email." The user is deterred from opening the email. The administrator of the email system is notified.

A description using a specific example (1) will now be given. FIG. 14 is an explanatory diagram illustrating an exemplary data structure of an email 1400. A process in the case of receiving the email 1400 will be described.

The email 1400 includes a Received field 1405A, a Received field 1405B, a From field 1410, a To field 1415, a CC field 1420, a Subject field 1425, a Reply-To field 1435, a Return-Path field 1440, and a Body Text field 1445. The Body Text field 1445 includes a target location 1450, a target location 1455, a target location 1460, and a target location 1465. The following is stated in the Body Text field 1445.

```
AA Corp., Mr. B
This information is valuable.
Open or click this link.
http://www.xx.co.jp
Call this number.
Telephone number: 0120-000-000
SS Corp., T
t@ss.co.jp
```

The sender of the email is actually Y of "XX Corp." (email address "y@xx.co.jp", domain "xx.co.jp"), but is misrepresenting oneself as T of "SS Corp." (email address "t@ss.co.jp", domain "ss.co.jp").

The recipient of the email is B of "AA Corp." (email address "b@aa.co.jp", domain "aa.co.jp").

To make the person reading the email believe that the email is from the prominent "SS Corp." and is trustworthy, a prominent company name ("SS Corp.") and domain ("ss.co.jp") are stated in the Subject field and in the body text.

Step S702:

The email is received and stored.

Step S704:

From the Received field 1405B, a sender domain name ("xx.co.jp") is detected. The correspondence table 600 illustrated in the example of FIG. 6 is referenced, and an organization name of the sender ("XX") is detected.

Step S706 to step S710:

From the From field 1410, a sender address ("y@xx.co.jp") and a sender domain ("xx.co.jp") are detected. The correspondence table 600 illustrated in the example of FIG. 6 is referenced, and an organization name of the sender ("XX") is detected.

Similarly, from the Reply-To field 1435, a sender address ("y@xx.co.jp"), a sender domain ("xx.co.jp"), and an organization name of the sender ("XX") are detected.

Similarly, from the Return-Path field 1440, a sender address ("y@xx.co.jp"), a sender domain ("xx.co.jp"), and an organization name of the sender ("XX") are detected.

Step S712:

The flowchart illustrated in the example of FIG. 8 is applied to execute the following process.

(1-1) The email address "t@ss.co.jp" is stated in the last area of the Body Text field 1445. This is detected as the email address of the sender. Additionally, the sender domain is detected as "ss.co.jp", and the organization of the sender is detected as "SS".

(1-2) Since "SS Corp." indicating the company name is stated in the last area of the Body Text field 1445, the organization name of the sender is detected as "SS". Subsequently, the correspondence table 600 is used to detect the domain as "ss.co.jp".

(1-3) In the last area of the Body Text field 1445, "SS" is included among the text strings of organization names in the correspondence table 600 (the organization name field 610) illustrated in the example of FIG. 6. "SS" is detected as the organization name of the sender. Subsequently, the correspondence table 600 is used to detect the domain "ss.co.jp" corresponding to the organization name of the sender as the domain of the sender.

The flowchart illustrated in the example of FIG. 9 is applied to execute the following process.

(2-1) The destination address in the To field 1415 of the email 1400 is "b@aa.co.jp". The destination domain "aa.co.jp" is detected from the destination address. Subsequently, the correspondence table 600 illustrated in the example of FIG. 6 is used to detect the organization name "AA" of the destination from the destination domain.

(2-2) The email address "t@ss.co.jp" is stated in the Body Text field 1445, and the email address "t@ss.co.jp" is different from the destination address "b@aa.co.jp" in the To field 1415. Accordingly, the email address "t@ss.co.jp" is detected as the email address of the sender, and the domain "ss.co.jp" of the sender is detected from the email address. Subsequently, the correspondence table 600 illustrated in the example of FIG. 6 is used to detect "SS" as the organization name of the sender.

(2-3) In the Body Text field 1445, "AA Corp." and "SS Corp." are included as text strings in a standard format indicating an organization name or a company name. Of these, since "AA Corp." is the same as the organization name "AA" of the destination, and since "SS Corp." is different from the organization name "AA" of the destination, "SS" is detected as the organization name of the sender. Subsequently, the correspondence table 600 illustrated in the example of FIG. 6 is used to detect the sender domain as "ss.co.jp".

(2-4) In the Body Text field 1445, "AA" and "SS" are included among the text strings of organization names in the correspondence table 600 (the organization name field 610) illustrated in the example of FIG. 6. Of these, since "AA" is the same as the organization name "AA" of the destination, and since "SS" is different from the organization name "AA" of the destination, "SS" is detected as the organization name of the sender. Subsequently, the correspondence table 600 illustrated in the example of FIG. 6 is used to detect the sender domain as "ss.co.jp".

(2-5) The text string "www.xx.co.jp" in the Body Text field 1445 is in an Internet address format, and is stated at the bottom (second half) of the Body Text field 1445. For this reason, the domain of the sender is detected as "xx.co.jp". Subsequently, the correspondence table 600 illustrated in the example of FIG. 6 is used to detect the organization name of the sender as "XX".

(2-6) The text string "0120-000-000" in the Body Text field 1445 is in a telephone number format, and is stated at the bottom (second half) of the Body Text field 1445. For this reason, the telephone number of the sender is detected as "0120-000-000". Subsequently, the correspondence table 600 illustrated in the example of FIG. 6 is used to detect the organization name of the sender as "XX".

By the above, in step S712, from the Body Text field 1445, the sender domain is detected as "xx.co.jp" or "ss.co.jp", and the organization name of the sender is detected as "XX" or "SS".

Step S714:

From the statement "SS Corp." in the Subject field 1425 of the email 1400, the sender domain is detected as "ss.co.jp", and the organization name of the sender is detected as "SS".

Step S716:

(8-1) The sender addresses detected from each of the From field 1410, the Reply-To field 1435, and the Return-Path field 1440 are "y@xx.co.jp". These sender addresses match.

(8-2) The sender domains detected from each of the From field 1410, the Reply-To field 1435, the Return-Path field 1440, and the Received field 1405B are "xx.co.jp". These sender domains match. Furthermore, the domain parts of the "from" part and the "by" part in the Received field 1405B also match.

(8-3) The sender domains detected from the Body Text field 1445 are "xx.co.jp" and "ss.co.jp". These sender domains do not match. The organization names of the sender detected from the Body Text field 1445 are "XX" and "SS". These organization names do not match.

(8-4) The sender domain detected from the Subject field 1425 is "ss.co.jp", and since there is only one, a determination of whether or not the sender domains match is not executed. The organization name of the sender detected from the Subject field 1425 is "SS", and since there is only one, a determination of whether or not the organization names match is not executed.

(8-5) The sender domains detected from the Body Text field 1445 are "xx.co.jp" and "ss.co.jp", while the sender domain detected from the Subject field 1425 is "ss.co.jp". These sender domains do not match. The organization name of the sender decided from the Body Text field 1445 is "XX" or "SS", while the organization name of the sender detected from the Subject field 1425 is "SS". These organization names do not match.

(8-6) The sender domains detected from the Body Text field 1445 are "xx.co.jp" and "ss.co.jp", while the sender domains detected from each of the From field 1410, the Reply-To field 1435, the Return-Path field 1440, and the Received field 1405B are "xx.co.jp". These sender domains do not match. The organization names of the sender detected from the Body Text field 1445 are "XX" and "SS", while the organization names of the sender detected from each of the From field 1410, the Reply-To field 1435, the Return-Path field 1440, and the Received field 1405B are "XX". These organization names do not match.

(8-7) The sender domain detected from the Subject field 1445 is "ss.co.jp", while the sender domains detected from each of the From field, the Reply-To field, the Return-Path field, and the Received field are "xx.co.jp". These sender domains do not match. The organization name of the sender detected from the Subject field is "SS", while the organization names of the sender detected from each of the From field, the Reply-To field, the Return-Path field, and the Received field are "XX". These organization names do not match.

Step S718:

Since there is non-matching information among (8-1) to (8-7) described above, a non-match is returned as the determination result of step S716. Consequently, the flow proceeds to step S724.

Step S724:

The email 1400 is determined to be a misrepresented email.

Step S726:

A process for misrepresented email is performed.

Step S799:

End.

In the case of using the technology described in Japanese Unexamined Patent Application Publication No. 2010-061406, only information obtained from the Received field 1405B and the From field 1410 is used to determine whether or not the email is misrepresented, and thus in this example, since the information obtained from the Received field 1405B and the information obtained from the From field 1410 match, it cannot be determined that the email is misrepresented.

In the present exemplary embodiment, information obtained from the Body Text field 1445 and the Subject field 1425 of the Return-Path field 1440 is also used, and thus it can be determined that the email is misrepresenting the sender.

A description using a specific example (2) will now be given. FIG. 15 is an explanatory diagram illustrating an exemplary data structure of an email 1500. A process in the case of receiving the email 1500 will be described.

The email 1500 includes a Received field 1505A, a Received field 1505B, a From field 1510, a To field 1515, a CC field 1520, a Subject field 1525, a Reply-To field 1535, a Return-Path field 1540, and a Body Text field 1545. The Body Text field 1545 includes a target location 1555, a target location 1560, and a target location 1565. The following is stated in the Body Text field 1545.

---
AA Corp., Mr. B
This information is valuable.
Call this number.
Telephone number: 0120-000-000
SS Corp., T
t@ss.co.jp

---

The email 1500 is an example in which the URL in the Body Text field 1445 has been removed from the email 1400 illustrated in the example of FIG. 14. The determination process is similar to the example of FIG. 14.

With respect to the email 1500, since a URL is not stated in the Body Text field 1545, in the case of using the technology described in Japanese Unexamined Patent Application Publication No. 2007-011967, a misrepresentation cannot be determined.

In the present exemplary embodiment, since statements other than a URL are also utilized, a misrepresentation can be determined.

Figure 16:
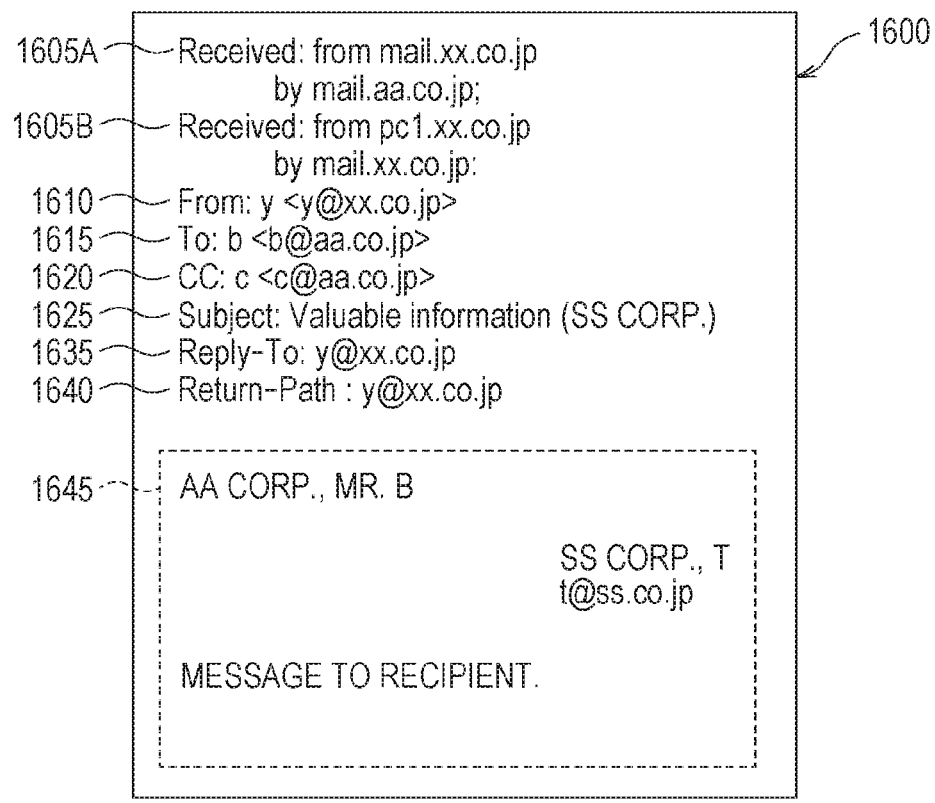
FIG. 16 is an explanatory diagram illustrating an exemplary data structure of an email.

A description using a specific example (3) will now be given. FIG. 16 is an explanatory diagram illustrating an exemplary data structure of an email 1600. A process in the case of receiving the email 1600 will be described.

The email 1600 includes a Received field 1605A, a Received field 1605B, a From field 1610, a To field 1615, a CC field 1620, a Subject field 1625, a Reply-To field 1635, a Return-Path field 1640, and a Body Text field 1645. The following is stated in the Body Text field 1645.

---
AA Corp., Mr. B

SS Corp., T
t@ss.co.jp

Message to recipient.

---

The email 1600 is an example in which the Body Text field 1445 of the email 1400 illustrated in the example of FIG. 14 has been changed. The determination process for the header part is similar to the example of FIG. 14.

In the Body Text field 1645, the recipient "AA Corp., Mr. B" first is stated on the left side. Below that, in a center area or on the right side, the organization name "SS" of the sender, the sender name "T", and the sender address "t@ss.co.jp" are stated.

As the process of detecting the organization name and domain in the Body Text field 1645, one of the following may be adopted.

(1) Detect organization names and domains in order of appearance in the Body Text field 1645.

Specifically, detect the organization name "AA" detected first in the Body Text field 1645 of the email 1600 as the destination.

Additionally, detect the organization name "SS" detected next as the organization name of the sender, and detect the domain "ss.co.jp" as the domain of the sender.

(2) Detect organization names and domains in accordance with placement in the Body Text field 1645 (including the concept of display position).

Specifically, detect the organization name "AA" detected in the upper-left area of the Body Text field 1645 of the email 1600 as the destination.

Additionally, detect the organization name "SS" detected in a center area or on the right side in the upper part of the Body Text field 1645 of the email 1600 as the organization name of the sender, and detect "ss.co.jp" as the domain of the sender.

(3) Detect organization names and domains in accordance with order of appearance and placement in the Body Text field 1645.

Specifically, detect the organization name "AA" detected first in the upper-left area of the Body Text field 1645 of the email 1600 as the destination.

Additionally, detect the organization name "SS" detected next after the organization name of the destination in a center area or on the right side of the Body Text field 1645 of the email 1600 as the organization name of the sender, and detect "ss.co.jp" as the domain of the sender.

Figure 17:
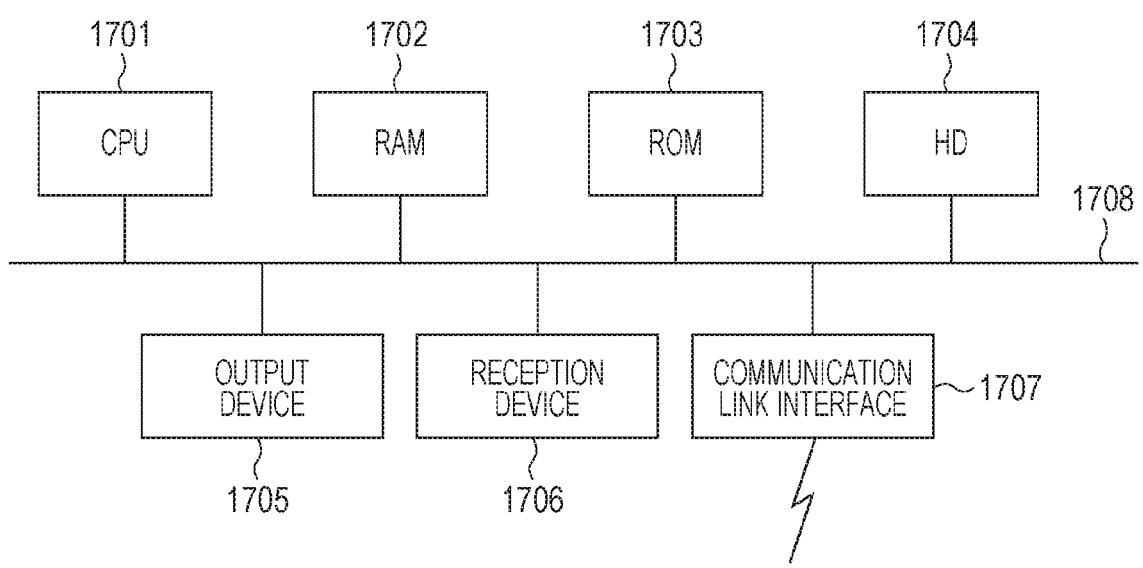
FIG. 17 is a block diagram illustrating an exemplary hardware configuration of a computer that realizes an exemplary embodiment.

Note that a hardware configuration of a computer executing a program that acts as the present exemplary embodiment is a general computer as illustrated by the example of FIG. 17, and specifically is a computer or the like that may be a personal computer or a server. In other words, as a specific example, a CPU 1701 is used as a processing unit (computational unit), while RAM 1702, ROM 1703, and an HD 1704 are used as storage devices. For the HD 1704, a hard disk or a solid-state drive (SSD) may be used, for example. The computer includes the CPU 1701 that executes programs such as the communication module 105, the mail reception module 110, the misrepresentation detection module 115, the detection (A) module 120, the detection (B) module 125, the misrepresentation determination module 135, and the misrepresentation handling processing module 140, the RAM 1702 that stores such programs and data, the ROM 1703 that stores programs and the like for booting the computer, the HD 1704 which is an auxiliary storage device (and may also be flash memory or the like) that includes the functions of the correspondence table storage module 130 and stores email and the like, a receiving device 1706 that receives data on the basis of operations performed by a user (including actions, voice commands, and gaze) with respect to devices such as a keyboard, mouse, touchscreen, microphone, or camera (including a gaze detection camera or the like), an output device 1705 such as a CRT, liquid crystal display, or a speaker, a communication link interface 1707 such as a network interface card for connecting to a communication network, and a bus 1708 for joining and exchanging data with the above components. Multiple such computers may also be connected to each other by a network.

Of the foregoing exemplary embodiments, for those made up of a computer program, software in the form of a computer program is made to be read into a system with the above hardware configuration, and the foregoing exemplary embodiments are realized by the cooperative action of the software and hardware resources.

Note that the hardware configuration illustrated in FIG. 17 illustrates a single exemplary configuration, and that the exemplary embodiment is not limited to the configuration illustrated in FIG. 17 insofar as the configuration still enables execution of the modules described in the exemplary embodiment. For example, some modules may also be realized with special-purpose hardware (such as an application-specific integrated circuit (ASIC), for example), and some modules may be configured to reside within an external system and be connected via a communication link. Furthermore, it may also be configured such that multiple instances of the system illustrated in FIG. 17 are connected to each other by a communication link and operate in conjunction with each other. Additionally, besides a personal computer in particular, an exemplary embodiment may also be incorporated into a device such as a server, a mobile information communication device, an information appliance, a robot, a photocopier, a fax machine, a scanner, a printer, or a multi-function device (that is, an image processing device having two or more from among scanning, printing, copying, and faxing functions).

Although an example is illustrated in which the by part of the Received field (1) is illustrated, the from part of the next Received field (2) may also be used. Note that the "next Received field (2)" refers to the Received field stated directly above the former Received field (1) in the header of an email.

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

The recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), the Internet, an intranet, an extranet, or some combination thereof, or alternatively, by being modulated onto a carrier wave and propagated.

Furthermore, the above program may be part or all of another program, or be recorded to a recording medium together with other separate programs. The above program may also be recorded in a split manner across multiple recording media. The above program may also be recorded in a compressed, encrypted, or any other recoverable form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer-readable medium storing a program causing a computer to execute a process for processing email, the process comprising:
   comparing first sender information detected from a body text or a subject of an email with second sender information detected from a header of the same email; and
   executing a misrepresentation handling process for the email in a case of a mismatch between the first sender information and the second sender information.

2. A non-transitory computer-readable medium storing a program causing a computer to execute a process for processing email, the process comprising:
   executing a first detection of detecting first sender information from a body text or a subject of an email;
   executing a second detection of detecting second sender information from a header of the same email;
   comparing the first sender information with the second sender information; and
   executing a misrepresentation handling process for the email in a case of a mismatch between the first sender information and the second sender information.

3. The non-transitory medium according to claim 2, wherein the first sender information is a first sender domain, and the second sender information is a second sender domain, and executing the first detection includes detecting an organization name of a sender from the body text or the subject of the email, and from the organization name of the sender, referencing a correspondence table between organization names and domains, and detecting the first sender domain.

4. The non-transitory medium according to claim 2, wherein the first sender information is a first sender organization name, and the second sender information is a second sender organization name, and executing the second detection includes detecting a domain of a sender from the header of the email, and from the domain of the sender, referencing a correspondence table between organization names and domains, and detecting the second sender organization name.

5. The non-transitory medium according to claim 2, wherein the misrepresentation handling process is executed for the email in a case of a mismatch between first sender information detected from a first location inside the body text or the subject of the email, and second sender information detected from a second location different from the first location inside the body text or the subject.

6. The non-transitory medium according to claim 2, wherein the first sender information and the second sender information are both sender domains, or are both organization names of a sender.

7. The non-transitory medium according to claim 2, wherein the second sender information is information detected from one or more of any of a From field, a Reply-To field, a Return-Path field, and a Received field of the email.

8. The non-transitory medium according to claim 2, wherein the misrepresentation handling process executes any one of, or a combination of, presenting a warning indicating a misrepresentation, presenting a reason for determining the misrepresentation, deterring opening of the email, and notifying an administrator.

9. The non-transitory medium according to claim 2, wherein in a case in which there is a location in which the first sender information is not detected successfully, and in a case of a mismatch between the first sender information detected from another location and the second sender information, the misrepresentation handling process presents an indication of a possibility of a misrepresentation.

10. An email processing device comprising:

a first detector configured to detect first sender information from a body text or a subject of an email;

a second detector configured to detect second sender information from a header of the same email;

a misrepresentation determination processor configured to compare the first sender information with the second sender information; and a misrepresentation handling processor configured to execute a misrepresentation handling process for the email in a case of a mismatch between the first sender information and the second sender information.

* * * * *